(12) United States Patent
Omae et al.

(10) Patent No.: US 7,126,622 B2
(45) Date of Patent: Oct. 24, 2006

(54) DRIVE IC AND OPTICAL PRINT HEAD

(75) Inventors: Mitsuhiro Omae, Tottori (JP); Osamu Nishikori, Shimane (JP)

(73) Assignees: Sanyo Electric Co., Ltd., Osaka (JP); Tottori Sanyo Electric Co., Ltd., Tottori (JP)

( * ) Notice: Subject to any disclaimer, the term of this patent is extended or adjusted under 35 U.S.C. 154(b) by 364 days.

(21) Appl. No.: 10/483,986

(22) PCT Filed: Aug. 8, 2002

(86) PCT No.: PCT/JP02/08149

§ 371 (c)(1),
(2), (4) Date: Jan. 22, 2004

(87) PCT Pub. No.: WO03/016064

PCT Pub. Date: Feb. 27, 2003

(65) Prior Publication Data
US 2004/0223046 A1 Nov. 11, 2004

(30) Foreign Application Priority Data
Aug. 10, 2001 (JP) .............................. 2001-243887

(51) Int. Cl.
B41J 2/447 (2006.01)
B41J 2/45 (2006.01)
(52) U.S. Cl. ...................... 347/237; 347/132
(58) Field of Classification Search ............... 347/237, 347/130, 132, 211
See application file for complete search history.

(56) References Cited

U.S. PATENT DOCUMENTS

| 5,719,680 | A | 2/1998 | Yoshida et al. | |
| 6,608,642 | B1 * | 8/2003 | Omae | 347/237 |
| 2004/0046854 | A1 * | 3/2004 | Omae | 347/132 |

FOREIGN PATENT DOCUMENTS

| JP | 4-291372 | 10/1992 |
| JP | 6-15877 | 1/1994 |
| JP | 7-304211 | 11/1995 |

* cited by examiner

*Primary Examiner*—Huan Tran
(74) *Attorney, Agent, or Firm*—Arent Fox PLLC

(57) ABSTRACT

A data signal which is output from a latch circuit (12) having five stages of latch circuits each storing one-line data signal to a drive circuit (16) for lighting each light emission unit is selected by a selection circuit (15) according to a 9-bit correction data signal for each of the light emission units stored in a Y-position correction data storage circuit (13). Thus, lighting timing of each light emission unit is adjusted, thereby performing printing having a preferable linearity.

15 Claims, 16 Drawing Sheets

FIG.7A
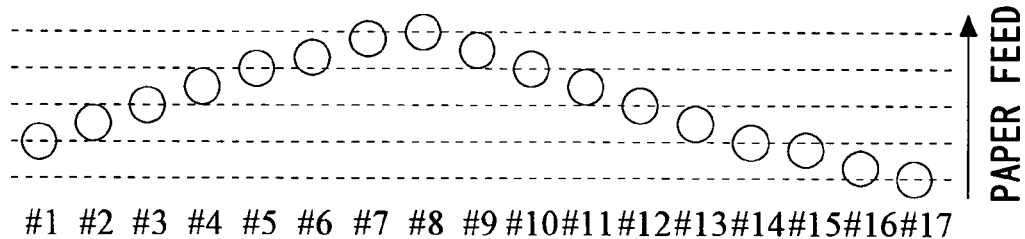
1 #2 #3 #4 #5 #6 #7 #8 #9 #10#11#12#13#14#15#16#17
FIG.7B
1 #2 #3 #4 #5 #6 #7 #8 #9 #10#11#12#13#14#15#16#17
db db dc dc dd dd dd de dd dd dc dc db db da da da
FIG.7C
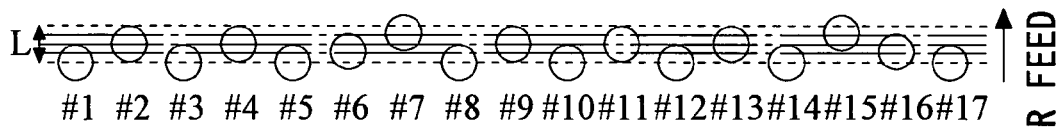
1 #2 #3 #4 #5 #6 #7 #8 #9 #10#11#12#13#14#15#16#17
FIG.7D
1 #2 #3 #4 #5 #6 #7 #8 #9 #10#11#12#13#14#15#16#17
ta tc ta tc ta tb td ta tc ta tc ta tc ta td tb ta
FIG.7E
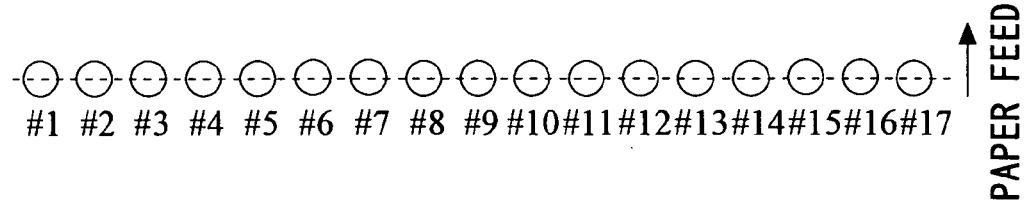
1 #2 #3 #4 #5 #6 #7 #8 #9 #10#11#12#13#14#15#16#17

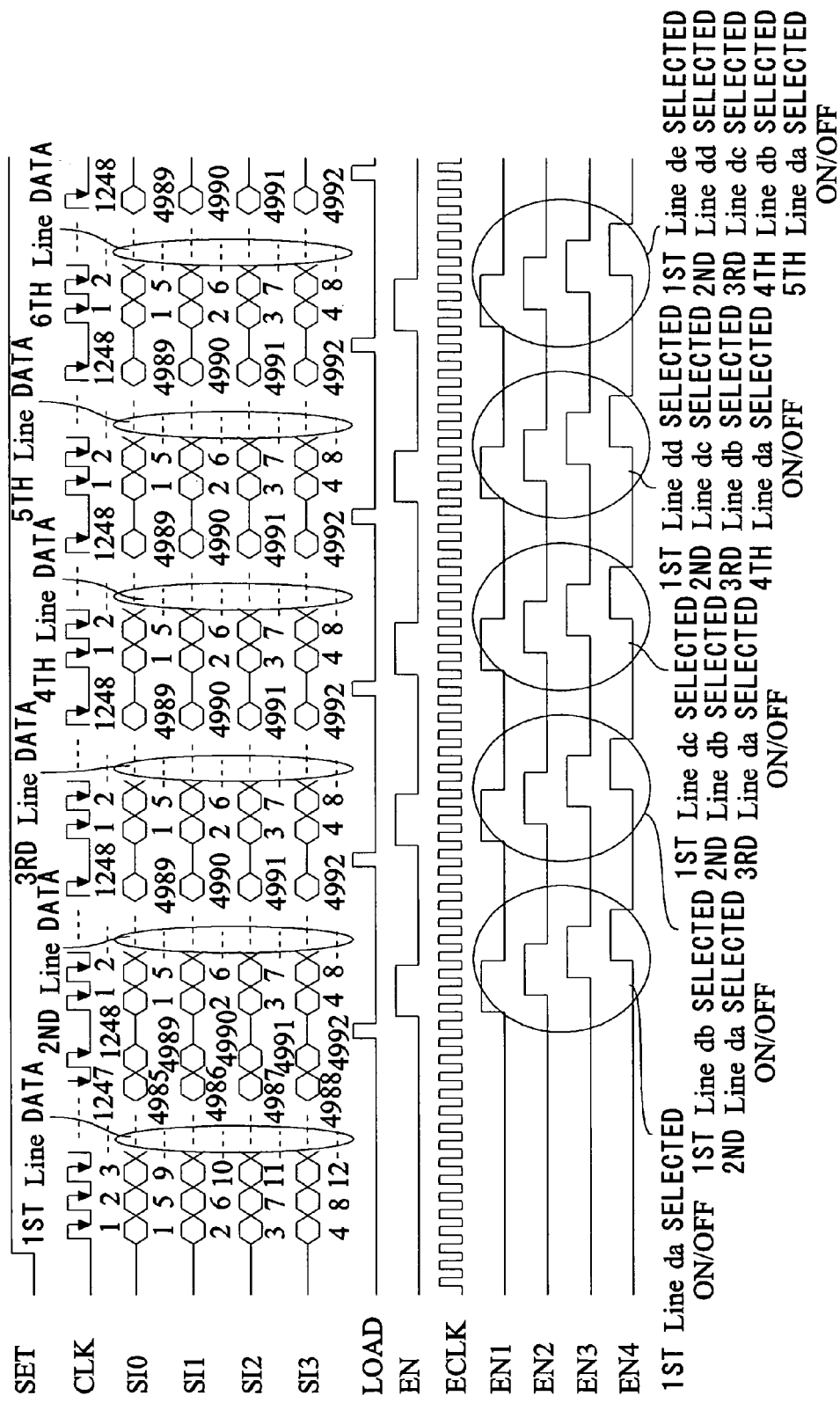

DRIVE IC AND OPTICAL PRINT HEAD

CROSS-REFERENCE TO RELATED APPLICATION

This application is a National Stage entry of International Application No. PCT/JP02/08149, filed Aug. 8, 2002, the entire specification claims and drawings of which are incorporated herewith by reference.

TECHNICAL FIELD

The present invention relates to an optical print head for use as a recording head in a printer or the like and to a driving IC for driving a light-emitting device provided in such an optical print head. More particularly, the present invention relates to an optical print head for use in a printer that achieves color printing by the use of a tandem-type print engine and to a driving IC for driving a light-emitting device provided in such an optical print head.

BACKGROUND ART

In a conventionally used optical print head, as shown in FIG. 17, there are provided a plurality of light-emitting devices and a plurality of driving ICs. The light-emitting devices are each composed of a plurality of light-emitting sections (it is to be understood that what is called a "light-emitting section" in the present specification corresponds to what is called a "light-emitting element" in the appended claims). The driving ICs each include, as shown in FIG. 18, a shift register 101 that takes in data signals, a latch circuit 102 that parallelly takes in the data signals taken in by the shifter register 101, a drive circuit 103 that drives the light emitting device, a current supply circuit 104 that supplies electric current to the drive circuit 103, and a timing control circuit 105 that supplies predetermined timing signals to various portions of the driving IC. Now, the conventional optical print head will be described assuming that, as shown in FIG. 17, it includes 26 driving ICs "b1" to "b26" that are connected in series and 4,992 light-emitting sections #1 to #4992 that are driven by those 26 driving ICs "b1" to "b26."

In the optical print head configured as described above, first, the driving IC "b" takes in four-bit data signals fed thereto via data input terminals SI0 to SI3 and moves them to the shift register 101 in synchronism with a clock pulse CLK. The shift register 101 then outputs the thus received four-bit data signals via data output terminals SO0 to SO3 to the data input terminals SI0 to SI3 of the next driving IC in synchronism with a clock pulse CLK.

Simultaneously, the clock pulse fed in via a clock input terminal CI is fed out through a buffer via a clock output terminal CO so as to be fed to the clock input terminal CI of the next driving IC. Thus, as shown in FIG. 19, when the 1,248th clock pulse CLK is fed in, the shift registers 101 of the 26 driving ICs "b1" to "b26" take in 4,992 data signals, each taking in 4×48 (192) data signals.

When 4,992 data signals have been taken in in this way, next, a load signal LOAD is fed to a load signal input terminal LI of the driving IC. When a timing signal produced from this load signal LOAD is fed to the latch circuit 102, which is of the 192-bit type, the 192 data signals taken in by the shift register 101 are stored therein.

Simultaneously, the load signal LOAD fed in via the load signal input terminal LI is fed out through a buffer via a load signal output terminal LO so as to be fed to the load signal input terminal LI of the next driving IC. Thus, when, as shown in FIG. 19, the load signal LOAD is fed in, the data signals taken in by the shift registers 101 of the 26 driving ICs "b1" to "b26" are stored in the respective latch circuits 102.

On the basis of 4,992 data signals stored in this way in the latch circuits 102 of the driving ICs "b1" to "b26," with 192 data signals stored in the latch circuit 102 of each driving IC, the drive circuit 103 supplies electric current to terminals DO1 to DO192 during the period in which a strobe signal STB is low and thereby drives the light-emitting sections #1 to #4992 to achieve printing of one line. While the drive circuit 103 is operating in this way, the load signal LOAD is turned low, and a clock pulse CLK is fed in again to take in the data signals of the next line.

The optical print head also has, as shown in a top view thereof in FIG. 1, an SLA (self-focusing lens array) 2 for covering the light-emitting device array 1 composed of a plurality of light-emitting sections and arranged in the middle, a lens holder 3 for keeping the SLA 2 in a fixed position, and positioning pins 4a and 4b for positioning the plurality of light-emitting sections constituting the light-emitting devices arranged in the light-emitting device array 1. The light-emitting sections constituting the light-emitting device array 1 are so positioned as to be located on the straight line connecting between the positioning pins 4a and 4b.

Conventionally, an optical print head like that described above is incorporated in a printer or the like to achieve printing on paper. Here, a bend in the LED array in which light-emitting devices mounted on a circuit board are arranged, or a bend in the optical axes of the lenses provided in the optical print head, or a bend in those lenses themselves results in a bend in the imaging positions. Suppose now that light-emitting devices are arranged in a direction called the X direction and the direction perpendicular thereto is called the Y direction. Then, a bend as described above occurs in the Y direction. Hereinafter, such a bend in the Y direction is called as a "Y bend."

A Y bend is observed, for example, as deviations of the imaging positions of light-emitting sections in the Y direction as shown in graphs in FIGS. 20 and 21. Such deviations of the imaging positions occur also as a result of the line connecting between the positioning pins 4a and 4b deviating obliquely in the Y direction.

A Y bend greatly degrades print quality in a tandem-type printer or the like that is provided with a plurality of optical print heads to achieve color printing. Moreover, to alleviate such lowering of print quality, it is necessary to sort out acceptable optical print heads from unusable ones, adjust lenses or sort out acceptable ones from unusable ones, or otherwise perform extra operation. This increases the costs of optical print heads and printers provided with such optical print heads.

An object of the present invention is to provide a driving IC that corrects deviations in imaging positions resulting from a mechanical or optical bend in an optical print head, and to provide an optical print head provided with such a driving IC.

DISCLOSURE OF THE INVENTION

To achieve the above object, according to one aspect of the present invention, a driving IC for driving elements is provided with: a drive circuit that produces drive signals for driving n elements based on n data signals constituting a group of data signals; x-stage latch circuits that each store one of x groups of data signals; a delay control circuit that produces, by delaying a one-input timing signal or two-input timing signals, y lighting timing signals for determining the timing with which the data signals corresponding to the individual elements are fed to the drive circuit; and a select circuit including a data signal selector that selects the data signals corresponding to the individual elements from the x-stage latch circuits and a timing signal selector that selects lighting timing signals corresponding to the individual elements from the y lighting timing signals produced by the delay control circuit. The select circuit feeds, for each of the elements separately, the data signals selected by the data signal selector to the drive circuit in synchronism with the lighting timing signals selected by the timing signal selector.

According to another aspect of the present invention, a driving IC for driving elements is provided with: a drive circuit that produces drive signals for driving n elements based on n data signals constituting a group of data signals; x-stage data signal latch circuits that store the data signals and that permit setting of the number of stages in which the data signals are latched for each of the elements separately; y-stage timing signal latch circuits that store n lighting timing signals for determining the timing with which to feed the data signals to the drive circuit and that permit setting of the number of stages in which the lighting timing signals are latched for each of the elements separately; an output control circuit that controls the timing with which the elements are driven by feeding, for each of the elements separately, the data signals fed from the data signal latch circuits to the drive circuit in synchronism with the lighting timing signals fed from the timing signal latch circuits. Here, in the data signal latch circuits, the number of stages in which the data signals are latched is so set that the data signals are output from the last-stage of the data signal latch circuits with x different timings, and, in the timing signal latch circuits, the number of stages in which the lighting timing signals are latched is so set that the lighting timing signals output from the last-stage of the timing signal latch circuits have y different delay timings.

According to another aspect of the present invention, an optical print head is provided with: a light-emitting device having n light-emitting sections; and a driving IC. The driving IC is provided with: a drive circuit that produces drive signals for driving n elements based on n data signals constituting a group of data signals; x-stage latch circuits that each store one of x groups of data signals; a delay control circuit that produces, by delaying a one-input timing signal or two-input timing signals, y lighting timing signals for determining the timing with which the data signals corresponding to the individual elements are fed to the drive circuit; and a select circuit including a data signal selector that selects the data signals corresponding to the individual elements from the x-stage latch circuits and a timing signal selector that selects lighting timing signals corresponding to the individual elements from the y lighting timing signals produced by the delay control circuit. The select circuit feeds, for each of the elements separately, the data signals selected by the data signal selector to the drive circuit in synchronism with the lighting timing signals selected by the timing signal selector.

According to another aspect of the present invention, an optical print head is provided with: a light-emitting device having n light-emitting sections; and a driving IC. The driving IC is provided with: a drive circuit that Produces drive signals for driving n elements based on n data signals constituting a group of data signals; x-stage data signal latch circuits that store the data signals and that permit setting of the number of stages in which the data signals are latched for each of the elements separately; y-stage timing signal latch circuits that store n lighting timing signals for determining the timing with which to feed the data signals to the drive circuit and that permit setting of the number of stages in which the lighting timing signals are latched for each of the elements separately; an output control circuit that controls the timing with which the elements are driven by feeding, for each of the elements separately, the data signals fed from the data signal latch circuits to the drive circuit in synchronism with the lighting timing signals fed from the timing signal latch circuits. Here, in the data signal latch circuits, the number of stages in which the data signals are latched is so set that the data signals are output from the last-stage of the data signal latch circuits with x different timings, and, in the timing signal latch circuits, the number of stages in which the lighting timing signals are latched is so set that the lighting timing signals output from the last-stage of the timing signal latch circuits have y different delay timings.

According to another aspect of the present invention, an optical print head is provided with: a light-emitting device having n light-emitting sections; a control circuit; and a driving IC. The control circuit is provided with: n-stage latch circuits that each store one of x groups of data signals, each group consisting of n data signals; a first select circuit that selects the data signals corresponding to the individual light-emitting sections from the x-stage latch circuits to produce one group of data signals from the selected n data signals; and a first shift register that temporarily stores the data signals selected by the first select circuit and that sequentially feeds out those data signals. The driving IC is provided with: a drive circuit that produces drive signals for driving the n light-emitting sections based on the n data signals constituting the one group of data signals; a delay control circuit that produces, by delaying a one-input timing signal or two-input timing signals, y lighting timing signals for determining the timing with which the data signals corresponding to the individual light-emitting sections are fed to the drive circuit; a second select circuit that selects the lighting timing signals corresponding to the individual light-emitting sections from the y lighting timing signals produced by the delay control circuit; and an output control circuit that feeds the data signals corresponding to the individual light-emitting sections output from the control circuit to the drive circuit in synchronism with the lighting timing signals selected by the second select circuit.

BRIEF DESCRIPTION OF DRAWINGS

FIGS. 7A to 7E are diagrams showing the relationship between the imaging positions of the light-emitting sections and the image printed with corrected Y positions.

FIG. 8 is a timing chart showing the operation of the driving IC shown in FIG. 4.

BEST MODE FOR CARRYING OUT THE INVENTION

Figure 1:
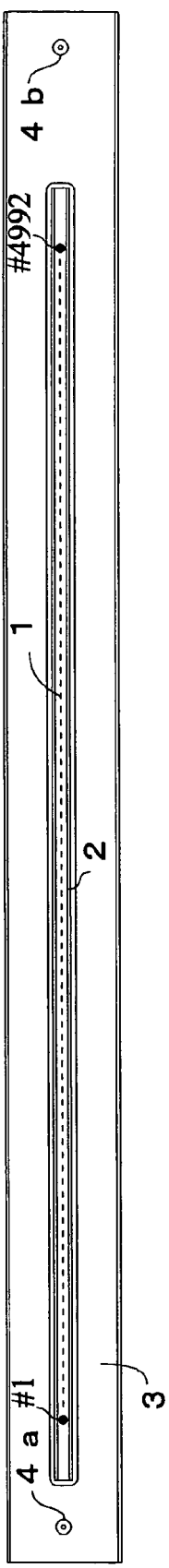
FIG. 1 is an external top view of an optical print head.
Figure 2:
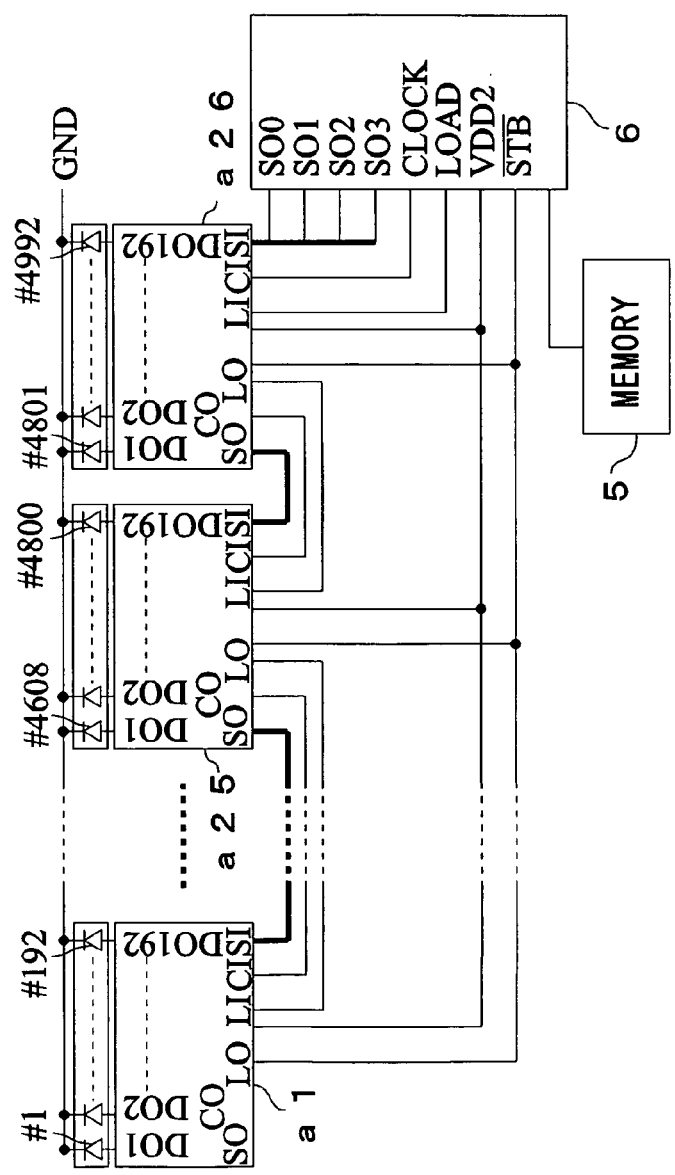
FIG. 2 is a block diagram showing the internal configuration of an optical print head embodying the invention.

Hereinafter, embodiments of the present invention will be described with reference to the drawings. The structure and configuration shown in FIGS. 1 and 2 are common to all the embodiments described hereinafter. An optical print head embodying the invention includes a light-emitting portion 1, an SLA 2, a lens holder 3, and positioning pins 4a and 4b as shown in FIG. 1, and has an internal configuration as shown in a block diagram in FIG. 2.

As shown in FIG. 2, in the optical print head embodying the invention, the light-emitting device array 1 is composed of 4,992 light-emitting sections #1 to #4992, and there are provided 26 driving ICs "a1" to "a26" for driving the light-emitting sections #1 to #4992, with each driving IC driving 192 light-emitting sections. There is also provided a memory 5, such as a flash memory, for storing data relating to the deviations of the positions of the light-emitting sections #1 to #4992 in the Y direction. There may additionally be provided a control circuit 6 for writing and reading data to and from the memory 5 and for feeding data to the driving ICs "a1" to "a26" to control their operation. The embodiments described below all take up, as a mere example, a case where there are provided 26 driving ICs and 4,992 light-emitting sections.

<First Embodiment>

Figure 3:
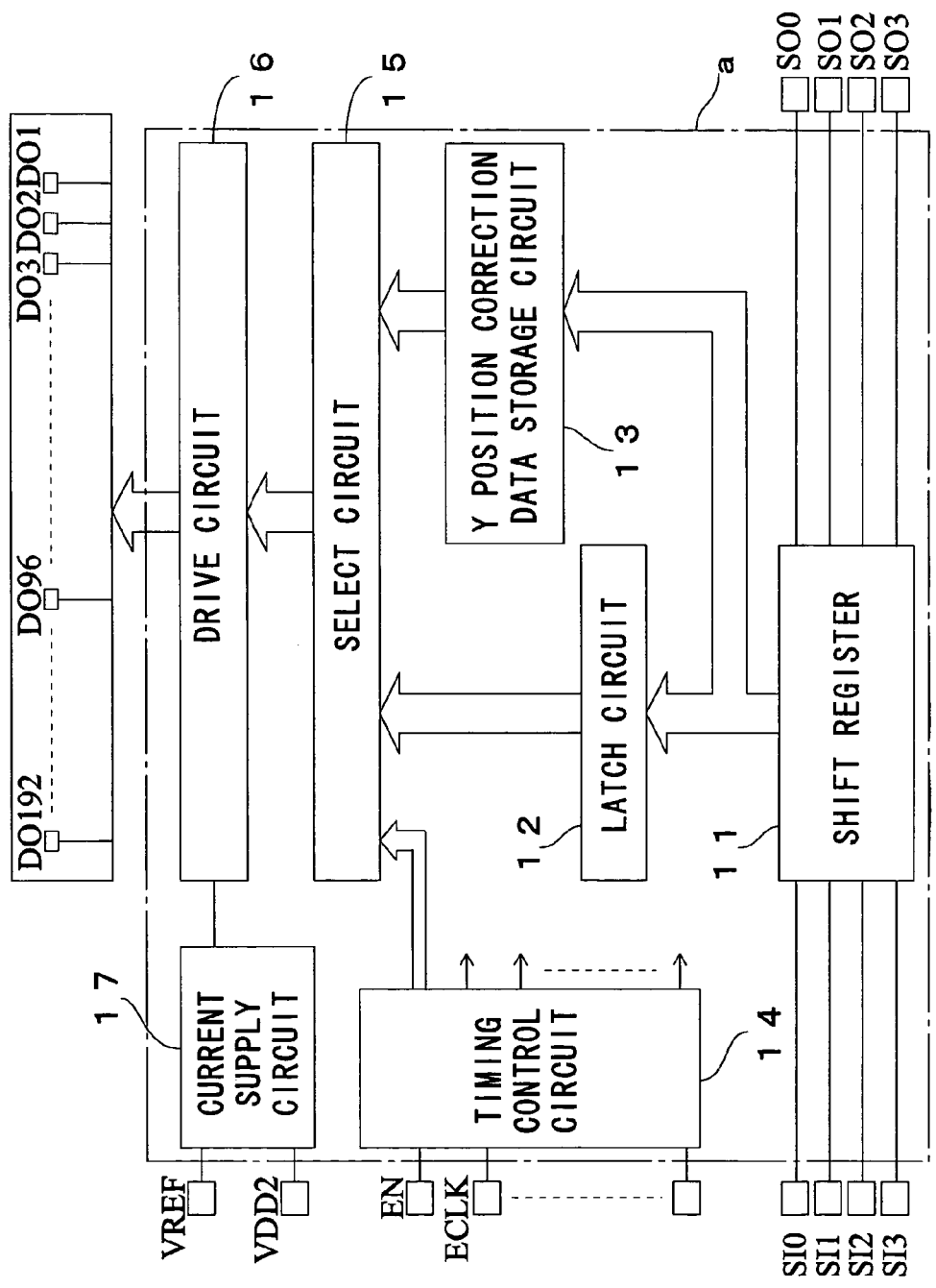
FIG. 3 is a block diagram showing the internal configuration of the driving IC provided in an optical print head embodying the invention.
Figure 4:
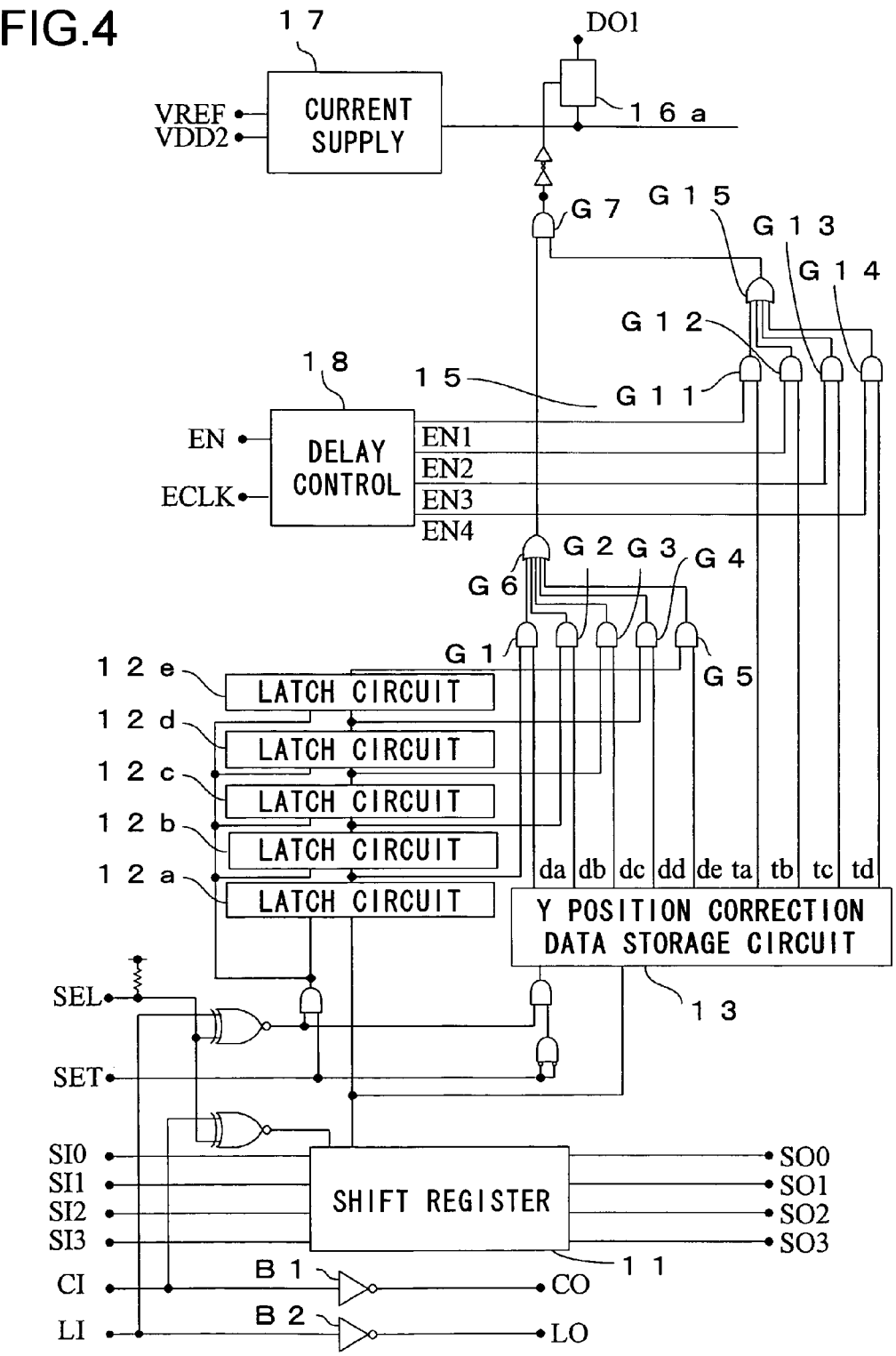
FIG. 4 is a block circuit diagram showing the internal configuration of the driving IC provided in the optical print head of a first embodiment of the invention.

Now, a first embodiment of the invention will be described with reference to the drawings. FIGS. 3 and 4 is a block diagram showing the internal configuration of the driving IC provided in the optical print head of this embodiment.

In the optical print head shown in FIG. 2, the driving IC "a" (i.e., each of the driving ICs "a1" to "a26" shown in FIG. 2) includes, as shown in FIG. 3, a 192-bit shift register 11 that takes in 4-bit data signals fed in via data input terminals SI0 to SI3, a latch circuit 12 that takes in, parallelly in units of 192 bits, the data signals taken in by the shift register 11, and a Y position correction data storage circuit 13 that stores 192 sets of correction data for correcting Y positions.

The driving IC "a" further includes a timing control circuit 14 that feeds predetermined timing signals to various portions thereof, a select circuit 15 that selects from among the data signals stored in the latch circuit 12 according to the correction data stored in the Y position correction data storage circuit 13, a drive circuit 16 that feeds out drive signals via output terminals DO1 to DO192 according to the data signals selected by the select circuit 15, and a current supply circuit 17 that feeds a constant current to the drive circuit 16.

Assuming that the driving IC "a" is configured as shown in FIG. 3 as described above, the latch circuit 12 is composed of five stages of 192-bit latch circuits connected in series. The latch circuit constituting each stage of the latch circuit 12 parallelly receives 192-bit data signals output from the shift register 11 or from the latch circuit of the previous stage. The latch circuit constituting each stage of the latch circuit 12 outputs 192-bit data signals, which are fed to the select circuit 15.

The select circuit 15 selects 192-bit data signals from among the 192×5-bit data signals fed from the latch circuit 12 according to 192×5-bit correction data among 192×9-bit correction data fed from the Y position correction data storage circuit 13, and then feeds the thus selected 192-bit data signals to the drive circuit 16 in synchronism with whichever of lighting timing signals EN1 to EN4 fed from the timing control circuit 14 is selected according to the remaining 192×4-bit correction data.

The Y position correction data storage circuit 13 is configured, for example, as a 192×9-bit latch circuit so as to be capable of storing 192 sets of correction data corresponding to the data signals, with each set of correction data consisting of 9 bits. The correction data is written to the Y position correction data storage circuit 13 in advance on the basis of signals fed parallelly in units of 192 bits from the shift register 11.

Specifically, the correction data stored in the memory 5 is read out by the control circuit of a printer itself or by the control circuit 6 provided within the print head, and is fed to the driving IC "a," where, with the Y position correction data storage circuit 13 alone kept in a writable state, for each data signal, one bit after another of the correction data is stored therein by repeating write operation nine times. In this way, the correction data is written to the Y position correction data storage circuit 13.

Now, with reference to FIG. 4, the configuration of the driving IC "a" configured as described above will be described in more detail. It is to be noted that, for simplicity's sake, FIG. 4 gives only a circuit block diagram of the portion of the driving IC "a" related to the output terminal DO1. The portions related to the other output terminals DO2 to DO192 are configured in similar manners, and therefore their explanations will be omitted.

The latch circuit 12 is composed of latch circuits 12a to 12e each capable of storing 192-bit data signals. In synchronism with a load signal LOAD, the 192-bit data signals stored in the shift register 11 are fed to the latch circuit 12a, the 192-bit data signals stored in the latch circuit 12a are fed to the latch circuit 12b, the 192-bit data signals stored in the latch circuit 12b are fed to the latch circuit 12c, the 192-bit data signals stored in the latch circuit 12c are fed to the latch circuit 12d, and the 192-bit data signals stored in the latch circuit 12d are fed to the latch circuit 12e.

Moreover, in synchronism with the load signal LOAD, the 192×5-bit data signals stored in all of these latch circuits 12a to 12e are fed simultaneously to the select circuit 15. The select circuit 15 thus receives 192×5-bit data signals, and selects therefrom 192-bit data signals to feed them to the output terminals DO1 to DO192 respectively. To achieve this, the select circuit 15 includes 192 gate circuits each composed of five AND gates G1 to G5 and one OR gate G6 and 192 gate circuits each composed of four AND gates G11 to G14 and one OR gate G15.

The select circuit 15 feeds the selected data signals to the drive circuit 16 in synchronism with one, at a time, of the lighting timing signals EN1 to EN4 generated by a delay control circuit 18. To achieve this, the select circuit 15 includes 192 AND gates G7 to which the outputs of the corresponding OR gates G6 and G15 are fed respectively. The drive circuit 16 is composed of 192 current amplifiers 16a that amplify the current supplied from the current supply circuit 17 and feed it to the output terminals DO1 to DO192 respectively.

Figure 5:
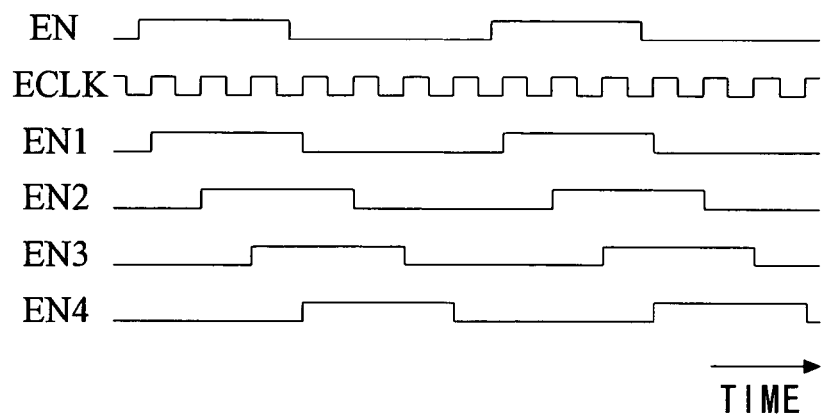
FIG. 5 is a timing chart showing the operation of the delay control circuit.
Figure 6:
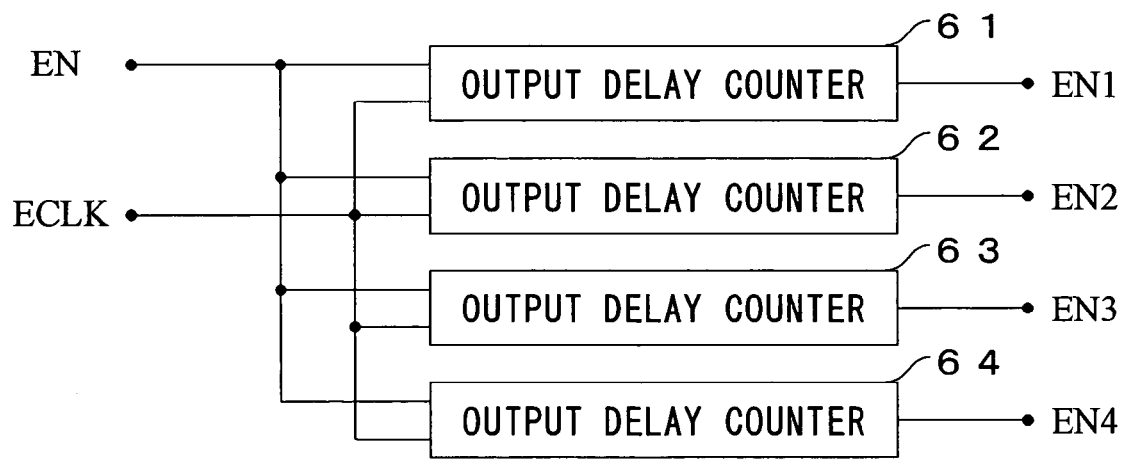
FIG. 6 is a block circuit diagram showing the internal configuration of the delay control circuit.

The delay control circuit 18 is, as shown in FIG. 5, which shows the waveforms of the signals relevant thereto, a circuit for generating lighting timing signals EN1 to EN4 for dividing the period defined by a timing signal EN into a plurality of periods according to a timing clock ECLK. Specifically, as shown in FIG. 6, the delay control circuit 18 can be built with four output delay counters 61 to 64 that each receive the timing signal EN and the timing clock ECLK. These output delay counters 61 to 64 output lighting timing signals EN1 to EN4, respectively, that are delayed by one period of the timing clock ECLK relative to one another.

In this way, the delay control circuit 18 generates four lighting timing signals EN1 to EN4 from one timing signal EN. That is, a control signal (the timing signal) is fed in by the use of fewer signal lines than there are lighting timing signals. This makes it possible to reduce the number of terminals for receiving external control signals and thereby miniaturize the IC. It is also possible to reduce the number of conductors, such as wire-bonded wires, for external connection. Moreover, the period for which each of the lighting timing signals EN1 to EN4 remains high is approximately equal to the period for which the timing signal EN remains high, and this permits the individual light-emitting sections to be kept lit for a long period.

Now, the operations performed with respect to the output terminal DO1 will be described. Five bits of correction data "da" to "de" output from the Y position correction data storage circuit 13 are fed to the five AND gates G1 to G5 respectively. These AND gates G1 to G5 also receive, one bit each, the data signals that are fed from the latch circuits 12a to 12e so as to be fed to the output terminal DO1. The outputs of the AND gates G1 to G5 are fed to the OR gate G6. Thus, the OR gate G6 outputs the output of that AND gate which receives whichever of the correction data bits "da" to "de" is high.

Moreover, four bits of correction data "ta" to "td" output from the Y position correction data storage circuit 13 are fed to the four AND gates G11 to G14. These AND gates G11 to G14 also receive respectively the lighting timing signals EN1 to EN4 generated by the delay control circuit 18. The outputs of the AND gates G11 to G14 are fed to the OR gate G15. Thus, the OR gate G15 outputs the output of that AND gate which receives whichever of the correction data bits "ta" to "td" is high. The outputs of the OR gates G6 and G15 are fed to the AND gate G7. Thus, the data signals selected according to the correction data "da" to "de" are fed through the AND gate G7 to the current amplifier 16a in synchronism with whichever of the lighting timing signals EN1 to EN4 is selected according to the correction data "ta" to "td."

The data signals output from the shift register 11 are fed out in units of four bits via the data output terminals SO0 to SO3 so as to be fed to the data input terminals SI0 to SI3 of the next driving IC "a." The clock CLK fed in via the clock input terminal CI is fed out through a buffer B1 via the clock output terminal CO so as to be fed to the clock input terminal CI of the next driving IC "a." The load signal LOAD fed in via the load signal input terminal LI is fed out through a buffer B2 via the load signal output terminal LO so as to be fed to the load signal input terminal LI of the next driving IC "a."

Now, the operation of the optical print head incorporating the driving ICs "a1" to "a26" each configured as described above will be described with reference to FIGS. 7A to 7E and 8. FIGS. 7A to 7E are diagrams showing the imaging positions of the light-emitting sections in the Y direction and the image printed with corrected Y positions. FIG. 8 is a timing chart showing the operation of the driving ICs.

First, a brief description will be given with reference to FIGS. 7A to 7E. It is to be noted that, in FIGS. 7A to 7E, for simplicity's sake, it is assumed that there are 17 dots, i.e., 17 light-emitting sections. Moreover, it is also assumed that paper is fed in the direction indicated by arrows in FIGS. 7A to 7E (i.e., in the direction opposite to the printing direction). First, the imaging positions of the individual light-emitting sections #1 to #17 are checked by measuring them with a CCD (charge-coupled device), or by measuring the curvature of a printed straight line, or by another method. On the basis of the imaging positions of the light-emitting sections #1 to #17 thus found, for each of the light-emitting sections #1 to #17, the correction data bits "da" to "de" and "ta" to "td" are so set as to represent the appropriate timing with which to light that light-emitting section. The correction data bits "da" to "de" and "ta" to "td" thus set are then written to the memory 5 by the control circuit 6.

For example, consider a case where the imaging positions of the light-emitting sections #1 to #17 are found to be located as shown in FIG. 7A and, among the light-emitting sections #1 to #17, the one with the lowest imaging position, namely the light-emitting section #17, is used as the reference position. In this case, as shown in FIG. 7B, for the light-emitting sections #15 to #17, the correction data bit "da" is set; for the light-emitting sections #1, #2, #13, and #14, the correction data bit "db" is set; for the light-emitting sections #3, #4, #11, and #12, the correction data bit "dc" is set; for the light-emitting sections #5 to #7, #9, and #10, the correction data bit "dd" is set; and for the light-emitting section #8, the correction data bit "de" is set. The correction data bits "da" to "de" thus set are then stored in the memory 5.

These correction data bits "da" to "de" are set in the following manner. The correction data bit "da" is set for those light-emitting sections of which the imaging position is close to the reference position. The correction data bit "db" is set for those light-emitting sections of which imaging position is deviated roughly one line from the reference position in the paper feed direction. The correction data bit "dc" is set for those light-emitting sections of which the imaging position is deviated roughly two lines from the reference position in the paper feed direction. The correction data bit "dd" is set for those light-emitting sections of which the imaging position is deviated roughly three lines from the reference position in the paper feed direction. The correction data bit "de" is set for those light-emitting sections of which the imaging position is deviated roughly four lines from the reference position in the paper feed direction.

With Y positions corrected according to the correction data bits "da" to "de," which are used to achieve Y position correction among different lines, the imaging positions of the light-emitting sections #1 to #17, which are found to be located as shown in FIG. 7A, are corrected as shown in FIG. 7C. However, as FIG. 7C clearly shows, even with Y positions corrected among different lines, the deviations of the imaging positions of the light-emitting sections from the reference position are not completely eliminated. To minimize the remaining deviations, the interval between the reference position and the position deviated one line therefrom in the paper feed direction is divided into four regions, and, for each of the light-emitting sections #1 to #17, the correction data bits "ta" to "td" are also set to correct their Y positions for deviations among those four regions. Here, the interval between two adjacent lines is assumed to be L.

Specifically, as shown in FIG. 7D, for the light-emitting sections #1, #3, #5, #8, #10, #12, #14, and #17, the correction data bit "ta" is set; for the light-emitting sections #6 and #16, the correction data bit "tb" is set; for the light-emitting sections #2, #4, #9, #11, and #13, the correction data bit "tc" is set; and for the light-emitting sections #7 and #15, the correction data bit "td" is set. The correction data bits "ta" to "td" thus set are then stored in the memory 5.

These correction data bits "ta" to "td" are set in the following manner. The correction data bit "ta" is set for those light-emitting sections of which the imaging position is close to the reference position. The correction data bit "tb" is set for those light-emitting sections of which the imaging position is deviated roughly (¼)L from the reference position in the paper feed direction. The correction data bit "tc" is set for those light-emitting sections of which the imaging position is deviated roughly (½)L from the reference position in the paper feed direction. The correction data bit "td" is set for those light-emitting sections of which the imaging position is deviated roughly (¾)L from the reference position in the paper feed direction.

For example, at start-up and the like, the correction data bits "da" to "de" and "ta" to "td" for the individual light-emitting sections #1 to #17 that are stored in the memory 5 are read out by the control circuit of a printer itself or by the control circuit 6 provided within the print head, and are fed to the driving IC "a" so as to be stored, through the shift register 11, in the Y position correction data storage circuit 13.

Then, first, the data signals stored in the latch circuit 12a are fed only through the AND gates G1 to which the correction data bit "da" is fed, i.e., those which correspond to the output terminals DO15 to DO17, and then through the corresponding OR gates G6 to the corresponding AND gates G7. In this state, when the delay control circuit 18 outputs the lighting timing signal EN1, the output of only the AND gate G11 to which the correction data bit "ta" is fed, i.e., that which corresponds to the output terminal DO17, turns high, and the output of this AND gate G11 is fed through the corresponding OR gate G15 to the corresponding AND gate G7. Thus, the data signals stored in the latch circuit 12a are fed only to the current amplifier 16a corresponding to the output terminal DO17, and electric current is fed to the light-emitting section #17, which thus performs printing close to the reference position.

When the delay control circuit 18, after outputting the lighting timing signal EN1, outputs the lighting timing signal EN2 with a delay equal to one period of the timing clock relative thereto, the output of only the AND gate G12 to which the correction data bit "tb" is fed, i.e., that which corresponds to the output terminal DO16, turns high, and the output of this AND gate G12 is fed through the corresponding OR gate G15 to the corresponding AND gate G7. Thus, the data signals stored in the latch circuit 12a are fed only to the current amplifier 16a corresponding to the output terminal DO16, and electric current is fed to the light-emitting section #16, which thus performs printing in the position deviated (¼)L from the reference position. After outputting the lighting timing signal EN2, the delay control circuit 18 outputs the lighting timing signal EN3 with a delay equal to one period of the timing clock relative thereto.

When the delay control circuit 18, after outputting the lighting timing signal EN3, outputs the lighting timing signal EN4 with a delay equal to one period of the timing clock relative thereto, the output of only the AND gate G14 to which the correction data bit "td" is fed, i.e., that which corresponds to the output terminal DO15, turns high, and the output of this AND gate G14 is fed through the corresponding OR gate G15 to the corresponding AND gate G7. Thus, the data signals stored in the latch circuit 12a are fed only to the current amplifier 16a corresponding to the output terminal DO15, and electric current is fed to the light-emitting section #15, which thus performs printing in the position deviated (¾)L from the reference position. When the printing of this line is complete, the data signals stored in the latch circuit 12a are moved to the latch circuit 12b.

Next, printing in the position deviated one line from the reference position is performed in the following manner. The data signals stored in the latch circuit 12b are fed only through the AND gates G2 to which the correction data bit "db" is fed, i.e., those which correspond to the output terminals DO1, DO2, DO13, and DO14, and then through the corresponding OR gates G6 to the corresponding AND gates G7. In this state, when the delay control circuit 18 outputs the lighting timing signal EN1, the outputs of only the AND gates G11 to which the correction data bit "ta" is fed, i.e., those which correspond to the output terminals DO1 and DO14, turn high, and the outputs of these AND gates G11 are fed through the corresponding OR gates G15 to the corresponding AND gates G7. Thus, the data signals stored in the latch circuit 12b are fed only to the current amplifiers 16a corresponding to the output terminals DO1 and DO14, and electric current is fed to the light-emitting sections #1 and #14, which thus perform printing in the position deviated one line from the reference position.

When the delay control circuit 18, after outputting the lighting timing signal EN2, outputs the lighting timing signal EN3, the outputs of only the AND gates G13 to which the correction data bit "tc" is fed, i.e., those which correspond to the output terminal DO2 and DO13, turn high, and the outputs of these AND gates G13 are fed through the corresponding OR gates G15 to the corresponding AND gates G7. Thus, the data signals stored in the latch circuit 12b are fed only to the current amplifier 16a corresponding to the output terminals DO2 and DO13, and electric current is fed to the light-emitting sections #2 and #13, which thus perform printing in the position deviated (½)L further from the position deviated one line from the reference position.

When the delay control circuit 18 outputs the lighting timing signal EN4, the printing of this line is complete, and the data signals stored in the latch circuit 12b are moved to the latch circuit 12c.

Next, printing in the position deviated two lines from the reference position is performed in the following manner. First, the data signals stored in the latch circuit 12c are fed only through the AND gates G3 to which the correction data bit "dc" is fed, i.e., those which correspond to the output terminals DO3, DO4, DO11, and DO12, and then through the corresponding OR gates G6 to the corresponding AND gates G7. In this state, when the delay control circuit 18 outputs the lighting timing signal EN1, the outputs of only the AND gates G11 to which the correction data bit "ta" is fed, i.e., those which correspond to the output terminals DO3 and DO12, turn high, and the outputs of these AND gates G11 are fed through the corresponding OR gates G15 to the corresponding AND gates G7. Thus, the data signals stored in the latch circuit 12c are fed only to the current amplifiers 16a corresponding to the output terminals DO3 and DO12, and electric current is fed to the light-emitting sections #3 and #12, which thus perform printing in the position deviated two lines from the reference position.

When the delay control circuit 18, after outputting the lighting timing signal EN2, outputs the lighting timing signal EN3, the outputs of only the AND gates G13 to which the correction data bit "tc" is fed, i.e., those which correspond to the output terminals DO4 and DO1, turn high, and the outputs of these AND gates G13 are fed through the corresponding OR gates G15 to the corresponding AND gates G7. Thus, the data signals stored in the latch circuit 12c are fed only to the current amplifiers 16a corresponding to the output terminals DO4 and DO11, and electric current is fed to the light-emitting sections #4 and #11, which thus perform printing in the position deviated (½)L further from the position deviated two lines from the reference position.

When the delay control circuit 18 outputs the lighting timing signal EN4, the printing of this line is complete, and the data signals stored in the latch circuit 12c are moved to the latch circuit 12d.

Next, printing in the position deviated three lines from the reference position is performed in the following manner. First, the data signals stored in the latch circuit 12d are fed only through the AND gates G4 to which the correction data bit "dd" is fed, i.e., those which correspond to the output terminals DO5 to DO7, DO9, and DO10, and then through the corresponding OR gates G6 to the corresponding AND gates G7. In this state, when the delay control circuit 18 outputs the lighting timing signal EN1, the outputs of only the AND gates G11 to which the correction data bit "ta" is fed, i.e., those which correspond to the output terminals DO5 and DO10, turn high, and the outputs of these AND gates G11 are fed through the corresponding OR gates G15 to the corresponding AND gates G7. Thus, the data signals stored in the latch circuit 12d are fed only to the current amplifiers 16a corresponding to the output terminals DO5 and DO10, and electric current is fed to the light-emitting sections #5 and #10, which thus perform printing in the position deviated three lines from the reference position.

When the delay control circuit 18 outputs the lighting timing signal EN2, the output of only the AND gate G12 to which the correction data bit "tb" is fed, i.e., that which corresponds to the output terminal DO6, turns high, and the output of this AND gates G12 is fed through the corresponding OR gate G15 to the corresponding AND gate G7. Thus, the data signals stored in the latch circuit 12d are fed only to the current amplifier 16a corresponding to the output terminal DO6, and electric current is fed to the light-emitting section #6, which thus performs printing in the position deviated (¼)L further from the position deviated three lines from to the reference position.

When the delay control circuit 18 outputs the lighting timing signal EN3, the output of only the AND gate G13 to which the correction data bit "tc" is fed, i.e., that which corresponds to the output terminal DO9, turns high, and the output of this AND gates G13 is fed through the corresponding OR gate G15 to the corresponding AND gate G7. Thus, the data signals stored in the latch circuit 12d are fed only to the current amplifier 16a corresponding to the output terminal DO9, and electric current is fed to the light-emitting section #9, which thus performs printing in the position deviated (½)L further from the position deviated three lines from to the reference position.

When the delay control circuit 18 outputs the lighting timing signal EN4, the output of only the AND gate G14 to which the correction data bit "td" is fed, i.e., that which corresponds to the output terminal DO7, turns high, and the output of this AND gates G14 is fed through the corresponding OR gate G15 to the corresponding AND gate G7. Thus, the data signals stored in the latch circuit 12d are fed only to the current amplifier 16a corresponding to the output terminal DO7, and electric current is fed to the light-emitting section #7, which thus performs printing in the position deviated (¾)L further from the position deviated three lines from to the reference position. When the printing of this line is complete, the data signals stored in the latch circuit 12d are moved to the latch circuit 12e.

Lastly, printing in the position deviated four lines from the reference position is performed in the following manner. First, the data signals stored in the latch circuit 12e are fed only through the AND gate G5 to which the correction data bit "de" is fed, i.e., that which corresponds to the output terminal DO8, and then through the corresponding OR gate G6 to the corresponding AND gate G7. In this state, when the delay control circuit 18 outputs the lighting timing signal EN1, the output of only the AND gate G11 to which the correction data bit "ta" is fed, i.e., that which corresponds to the output terminal DO8, turns high, and the output of this AND gate G11 is fed through the corresponding OR gate G15 to the corresponding AND gate G7. Thus, the data signals stored in the latch circuit 12e are fed only to the current amplifier 16a corresponding to the output terminal DO8, and electric current is fed to the light-emitting section #8, which thus perform printing in the position deviated four lines from to the reference position.

Thereafter, the lighting timing signals EN2, EN3, and EN4 are output with a delay equal to one period of the timing clock ECLK relative to one another. Ultimately, with Y positions corrected, the printed image exhibits greatly improved linearity as shown in FIG. 7E as compared with that shown in FIG. 7C.

In this way, the light-emitting sections #15 to #17 are fed with the data of the line currently being printed, the light-emitting sections #1, #2, #13, and #14 are fed with the data of the line one line previous to the line currently being printed, the light-emitting sections #3, #4, #11, and #12 are fed with the data of the line two lines previous to the line currently being printed, the light-emitting sections #5 to #7, #9, and #10 are fed with the data of the line three lines previous to the line currently being printed, and the light-emitting section #8 is fed with the data of the line four lines previous to the line currently being printed.

In addition, the data to be fed to the individual light-emitting sections #1 to #17 is fed thereto in the following manner. The light-emitting sections #1, #3, #5, #8, #10, #12, #14, and #17 receive the data in synchronism with the lighting timing signal EN1, the light-emitting sections #6 and #16 receive the data in synchronism with the lighting timing signal EN2, the light-emitting sections #2, #4, #9, #11, and #13 receive the data in synchronism with the lighting timing signal EN3, and the light-emitting sections #7 and #15 receive the data in synchronism with the lighting timing signal EN4.

Next, the operation of this optical print head will be described in detail with reference to a timing chart shown in FIG. 8. The correction data stored in the memory 5 has previously been written to the Y position correction data storage circuit 13 in the manner described earlier. Then, first, a set signal SET turns from low to high to inhibit writing to the Y position correction data storage circuit 13.

Then, data signals corresponding to 1 line (4,992 bits) are fed, in units of four bits and one unit after the next, to the data input terminals SI0 to SI3 of the driving IC "a26" located at an end, and those data signals are taken in by the shift registers 11 of the driving ICs "a1" to "a26" in synchronism with pulses in the clock CLK. Specifically, the first, fifth, ninth, data signals are fed to the data input terminal SI0 of the driving IC "a26," the second, sixth, tenth, . . . data signals are fed to the data input terminal S11 of the driving IC "a26," the third, seventh, eleventh, . . . data signals are fed to the data input terminal S12 of the driving IC "a26," and the fourth, eighth, twelfth, . . . data signals are fed to the data input terminal S13 of the driving IC "a26."

When the 1,248th clock pulse CLK is fed in, of the data signals corresponding to the first line, the 1st to 192nd data signals, the 193rd to 384th data signals, . . . , and the 4,801st to 4,992nd data signals are stored in the shift registers 11 of the driving ICs "a1," "a2," . . . , and "a26" respectively. When the data signals of the first line have been stored in the shift registers 11 of the driving ICs "a1" to "a26" in this way, the clock CLK ceases to be fed in, and a high level is fed in as the load signal LOAD.

In synchronism with the load signal LOAD, in each of the driving ICs "a1" to "a26," the data signals of the first line stored in the shift register 11 are written to the latch circuit 12a. The data signals thus written to the latch circuit 12a are fed only through the AND gates G1 to which the correction data bit "da" is fed and then through the corresponding OR gates G6 to the corresponding AND gates G7. Thus, of the data signals of the first line stored in the latch circuit 12a, only those to be fed to the light-emitting sections located in the position corresponding to the correction data bit "da" (i.e., those located close to the reference position) are fed from the latch circuit 12a to the AND gates G7.

Subsequently, the load signal LOAD is turned low, and then the clock CLK starts being fed in again at the same time that a pulse signal that remains high for a predetermined period is fed in as the timing signal EN. This causes the delay control circuit 18 to output the lighting timing signals EN1 to EN4 in the order EN1, then EN2, then EN3, and then EN4 as described with reference to FIG. 5.

As a result, first, the lighting timing signal EN1 is fed through the AND gates G11 to which the correction data bit "ta" is fed and then through the corresponding OR gates G15 to the corresponding AND gates G7, and thus the data signals to be fed to the light-emitting sections located close to the reference position of the first line are fed to the drive circuit 16. Next, when the lighting timing signal EN2 appears with a delay equal to one period of the timing clock ECLK, it is fed through the AND gates G12 to which the correction data bit "tb" is fed and then through the corresponding OR gates G15 to the corresponding AND gates G7. Thus, the data signals to be fed to the light-emitting sections located in the position deviated (¼)L from the reference position of the first line are fed to the drive circuit 16.

Next, when the lighting timing signal EN3 appears with a delay equal to one period of the timing clock ECLK, it is fed through the AND gates G13 to which the correction data bit "tc" is fed and then through the corresponding OR gates G15 to the corresponding AND gates G7. Thus, the data signals to be fed to the light-emitting sections located in the position deviated (½)L from the reference position of the first line are fed to the drive circuit 16. Lastly, when the lighting timing signal EN4 appears with a delay equal to one period of the timing clock ECLK, it is fed through the AND gates G14 to which the correction data bit "td" is fed and then through the corresponding OR gates G15 to the corresponding AND gates G7. Thus, the data signals to be fed to the light-emitting sections located in the position deviated (¾)L from the reference position of the first line are fed to the drive circuit 16. Concurrently, in synchronism with clocks in the pulse CLK, the data signals corresponding to the second line are taken in by the shift register 11 of the driving IC "a."

Thereafter, when the data signals of the second line are stored in the shift register 11 of the driving IC "a," a high level is fed in as the load signal LOAD. This causes the data signals of the first line stored in the latch circuit 12a to be written to the latch circuit 12b, and simultaneously the data signals of the second line stored in the shift register 11 to be written to the latch circuit 12a. The data signals thus written to the latch circuit 12a are fed through the AND gates G1 to which the correction data bit "da" is fed and then through the corresponding OR gates G6 to the corresponding AND gates G7. On the other hand, the data signals written to the latch circuit 12b are fed through the AND gates G2 to which the correction data bit "db" is fed and then through the corresponding OR gates G6 to the corresponding AND gates G7.

As a result, first, the lighting timing signal EN1 is fed through the AND gates G11 to which the correction data bit "ta" is fed and then through the corresponding OR gates G15 to the corresponding AND gates G7, and thus the data signals to be fed to the light-emitting sections located close to the reference position of the second line and those to be fed to the light-emitting sections located in the position deviated one line from the reference position of the first line are fed to the drive circuit 16. Next, when the lighting timing signal EN2 appears with a delay equal to one period of the timing clock ECLK, it is fed through the AND gates G12 to which the correction data bit "tb" is fed and then through the corresponding OR gates G15 to the corresponding AND gates G7. Thus, the data signals to be fed to the light-emitting sections located in the position deviated (¼)L from the reference position of the second line and those to be fed to the light-emitting sections located in the position deviated one line plus (¼)L from the reference position of the first line are fed to the drive circuit 16.

Next, when the lighting timing signal EN3 appears with a delay equal to one period of the timing clock ECLK, it is fed through the AND gates G13 to which the correction data bit "tc" is fed and then through the corresponding OR gates G15 to the corresponding AND gates G7. Thus, the data signals to be fed to the light-emitting sections located in the position deviated (½)L from the reference position of the second line and those to be fed to the light-emitting sections located in the position deviated one line plus (½)L from the reference position of the first line are fed to the drive circuit 16.

Lastly, when the lighting timing signal EN4 appears with a delay equal to one period of the timing clock ECLK, it is fed through the AND gates G14 to which the correction data bit "td" is fed and then through the corresponding OR gates G15 to the corresponding AND gates G7. Thus, the data signals to be fed to the light-emitting sections located in the position deviated (¾)L from the reference position of the second line and those to be fed to the light-emitting sections located in the position deviated one line plus (¾)L from the reference position of the first line are fed to the drive circuit 16. Concurrently, in synchronism with clocks in the pulse CLK, the data signals corresponding to the third line are taken in by the shift register 11 of the driving IC "a."

Thereafter, the clock CLK, the load signal LOAD, and the timing signal EN repeat behaving in the manner described above and thereby achieve the following operations. First, the data signals corresponding to the third, second, and first lines are stored in the latch circuits 12a, 12b, and 12c respectively. Then, with respect to the light-emitting sections located in positions deviated roughly two lines from the reference position of the first line, those located in position deviated roughly one line from the reference position of the second line, and those located close to the reference position of the third line, current is fed first to those located in the position of the respective line, then to those located in the position deviated (¼)L from the respective line, then to those located in the position deviated (½)L from the respective line, and then to those located in the position deviated (¾)L from the respective line.

Next, the data signals corresponding to the fourth, third, second, and first lines are stored in the latch circuits 12a, 12b, 12c, and 12d respectively. Then, with respect to the light-emitting sections located in positions deviated roughly three lines from the reference position of the first line, those located in position deviated roughly two lines from the reference position of the second line, those located in position deviated roughly one line from the reference position of the third line, and those located close to the reference position of the fourth line, current is fed first to those located in the position of the respective line, then to those located in the position deviated (¼)L from the respective line, then to those located in the position deviated (½)L from the respective line, and then to those located in the position deviated (¾)L from the respective line.

Next, the data signals corresponding to the fifth, fourth, third, second, and first lines are stored in the latch circuits 12a, 12b, 12c, 12d, and 12e respectively. Then, with respect to the light-emitting sections located in positions deviated roughly four lines from the reference position of the first line, those located in position deviated roughly three lines from the reference position of the second line, those located in position deviated roughly two lines from the reference position of the third line, those located in position deviated roughly one line from the reference position of the fourth line, and those located close to the reference position of the fifth line, current is fed first to those located in the position of the respective line, then to those located in the position deviated (¼)L from the respective line, then to those located in the position deviated (½)L from the respective line, and then to those located in the position deviated (¾)L from the respective line.

Thus, it is when the light emission for five lines is complete that the light emission for the first line is complete. Thereafter, the operations described above are repeated so that the light emission for the second, third, . . . lines are performed successively until eventually exposure is complete over one whole screen of an electrostatic printer.

As described above, in this embodiment, the driving ICs "a1" to "a26" perform Y position correction among different lines and Y position correction among different regions between adjacent lines simultaneously. That is, the driving ICs "a1" to "a26" correct Y positions for deviations as shown in FIG. 7A to directly obtain corrected Y positions as shown in FIG. 7E. In this way, it is possible to correct a Y bend with high accuracy.

<Second Embodiment>

Figure 9:
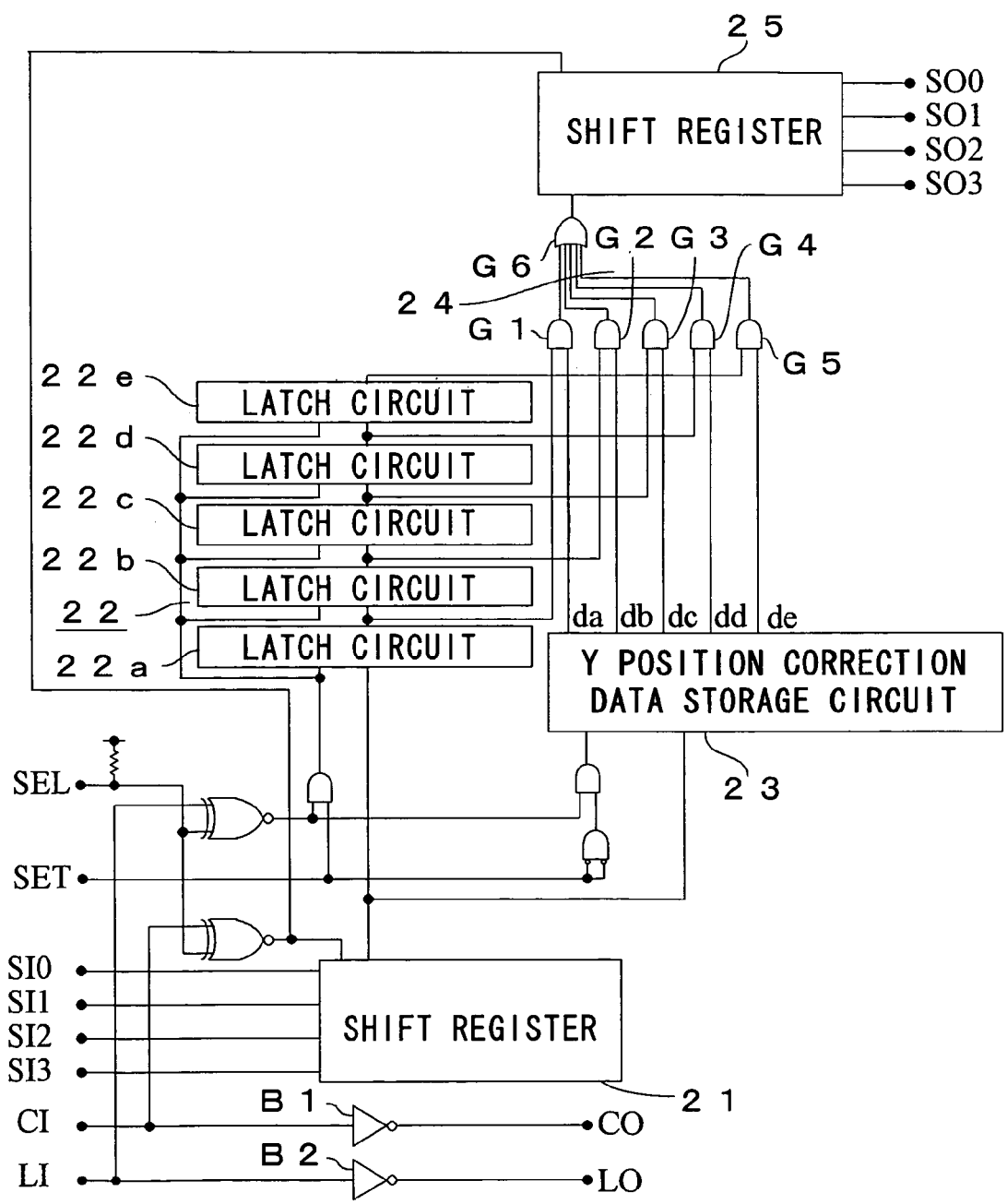
FIG. 9 is a block circuit diagram showing the configuration of a principal portion of the control circuit provided in the optical print head of a second embodiment of the invention.
Figure 10:
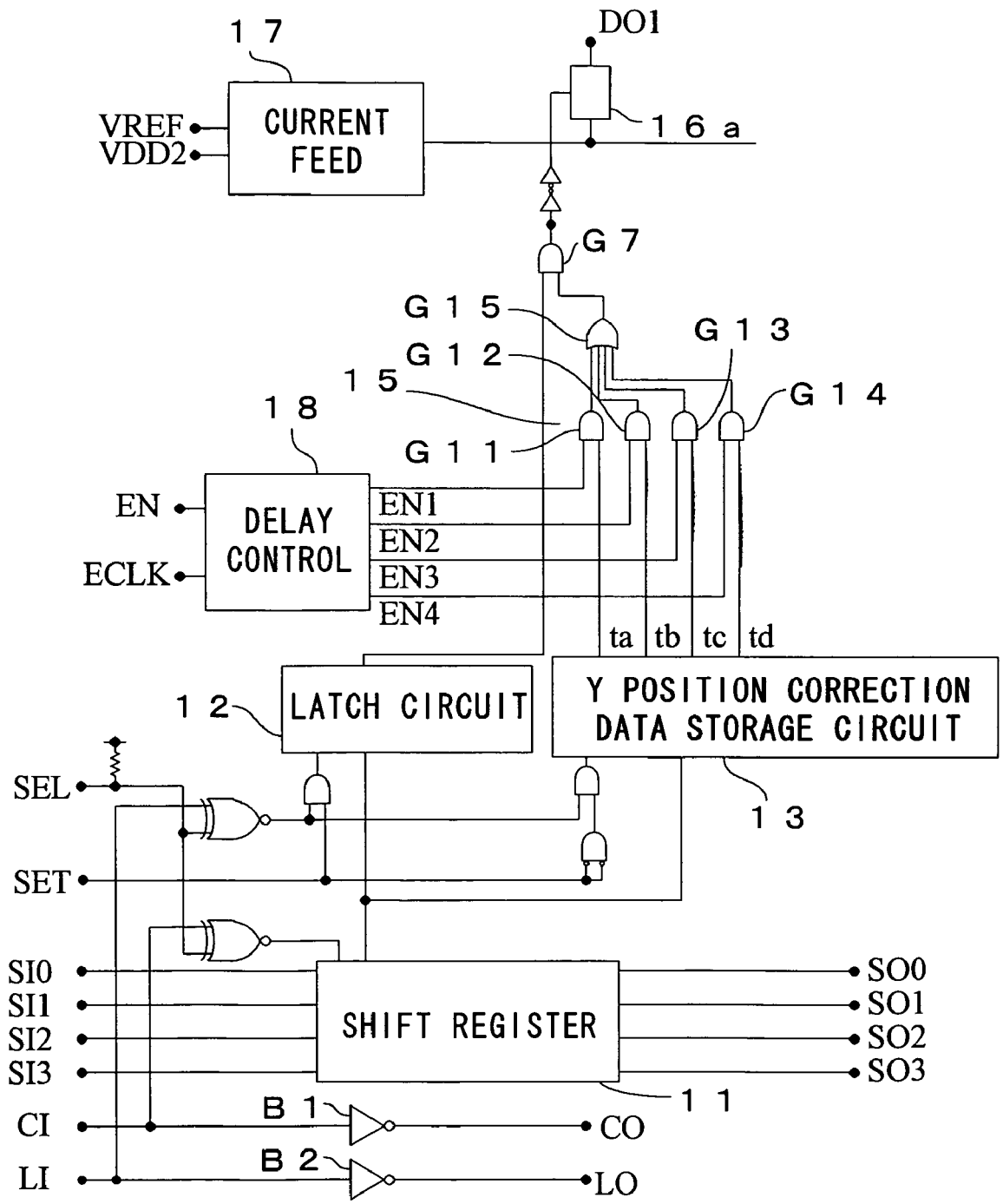
FIG. 10 is a block circuit diagram showing the internal configuration of the driving IC provided in the optical print head of the second embodiment.

Now, a second embodiment of the invention will be described with reference to the drawings. FIG. 9 is a block circuit diagram showing the configuration of a principal portion of the control circuit provided in the optical print head of this embodiment. FIG. 10 is a block circuit diagram showing the internal configuration of the driving IC provided in the optical print head of this embodiment. In FIG. 10, such circuit elements as serve the same purposes as in FIG. 4 are identified with the same reference numerals and symbols, and their detailed explanations will not be repeated. The driving IC used in this embodiment, in its outline, is configured in the same manner as that used in the first embodiment, i.e., as shown in the block diagram of FIG. 3.

In this embodiment, assuming that the optical print head is configured as shown in FIG. 2 as described earlier, the correction data bits "da" to "de" are fed to the control circuit 6 so that, first, the control circuit 6 performs Y position correction among different lines on the data signals to be fed to the driving ICs "a1" to "a26." Thereafter, the data signals corrected by the control circuit 6 are subjected to Y position correction among different regions between adjacent lines which is performed by the driving ICs "a1" to "a26," to which the correction data bits "ta" to "td" are fed.

This control circuit 6 is configured as shown in FIG. 9. It is to be noted that, for simplicity's sake, FIG. 9 gives only a circuit block diagram of the portion of the control circuit 6 related to the light-emitting section #1. The portions related to the other light-emitting sections #2 to #4992 are configured in similar manners, and therefore their explanations will be omitted.

The control circuit 6 shown in FIG. 9 includes a 4,992-bit shift register 21 that takes in 4-bit data signals fed in via data input terminals SI0 to SI3, a five-stage latch circuit 22 that takes in, parallelly in units of 4,992 bits, the data signals taken in by the shift register 21, a Y position correction data storage circuit 23 that stores 4,992 sets of correction data for correcting Y positions, a select circuit 24 that selects from among the data signals stored in the latch circuit 22 according to the correction data stored in the Y position correction data storage circuit 23, and a 4,992-bit shift register 25 that takes in the data signals selected by the select circuit 24.

The latch circuit 22 is composed of latch circuits 22a to 22e each capable of storing 4,992-bit data signals. In synchronism with a load signal LOAD, the 4,992-bit data signals stored in the shift register 21 are fed to the latch circuit 22a, the 4,992-bit data signals stored in the latch circuit 22a are fed to the latch circuit 22b, the 4,992-bit data signals stored in the latch circuit 22b are fed to the latch circuit 22c, the 4,992-bit data signals stored in the latch circuit 22c are fed to the latch circuit 22d, and the 4,992-bit data signals stored in the latch circuit 22d are fed to the latch circuit 22e.

Moreover, in synchronism with the load signal LOAD, the 4,992×5-bit data signals stored in all of these latch circuits 22a to 22e are fed simultaneously to the select circuit 24. The select circuit 24 thus receives 4,992×5-bit data signals, and selects therefrom 4,992-bit data signals to feed them to the driving ICs "a1" to "a26" respectively. To achieve this, the select circuit 24 includes 4,992 gate circuits each composed of five AND gates G1 to G5 and one OR gate G6.

The 4,992-bit data signals selected by the select circuit 24 are fed to the shift register 25 and are stored therein for a while. The shift register 25 feeds out the 4,992-bit data signals stored therein in units of 4 bits via the data output terminals SO0 to SO3 so as to be fed to the driving IC "a26."

Now, the operations performed with respect to the data signal for the light-emitting section #1 will be described. Five bits of correction data "da" to "de" output from the Y position correction data storage circuit 23 are fed to the five AND gates G1 to G5 respectively. These AND gates G1 to G5 also receive, one bit each, the data signals that are fed from the latch circuits 22a to 22e for the light-emitting section #1. The outputs of the AND gates G1 to G5 are fed to the OR gate G6. Thus, the OR gate G6 outputs the output of that AND gate which receives whichever of the correction data bits "da" to "de" is high. The output of the OR gate G6 is fed to the shift register 25.

The clock CLK fed in via the clock input terminal CI is fed out through a buffer B1 via the clock output terminal CO so as to be fed to the clock input terminal CI of the driving IC "a26." The load signal LOAD fed in via the load signal input terminal LI is fed out through a buffer B2 via the load signal output terminal LO so as to be fed to the load signal input terminal LI of the next driving IC "a26."

The Y position correction data storage circuit 23 is configured, for example, as a 4,992×5-bit latch circuit so as to be capable of storing 4,992 sets of correction data corresponding to the data signals, with each set of correction data consisting of 5 bit. The correction data is written to the Y position correction data storage circuit 23 in advance on the basis of signals fed parallelly in units of 4,992 bits from the shift register 21.

Specifically, the correction data stored in the memory 5 is read out by the control circuit of a printer itself or by the control circuit 6 provided within the print head, and is fed to the control circuit 6, where, with the Y position correction data storage circuit 23 alone kept in a writable state, for each data signal, one bit after another of the correction data is stored therein by repeating write operation five times. In this way, the correction data is written to the Y position correction data storage circuit 23.

Assuming that the driving IC "a" is configured as shown in FIG. 10, the latch circuit 12 here, as opposed to that used in the first embodiment, is composed of a single stage of a 192-bit latch circuit that parallelly receives 192-bit data signals output from the shift register 11. The select circuit 15 feeds the 192-bit data signals fed from the latch circuit 12 to the drive circuit 16 in synchronism with whichever of lighting timing signals EN1 to EN4 fed from the timing control circuit 14 is selected according to 192×4-bit correction data fed from the Y position correction data storage circuit 13.

The Y position correction data storage circuit 13 is configured, for example, as a 192×4-bit latch circuit so as to be capable of storing 192 sets of correction data corresponding to the data signals, with each set of correction data consisting of 4 bit. The correction data is written to the Y position correction data storage circuit 13 in advance on the basis of signals fed parallelly in units of 192 bits from the shift register 11.

Specifically, the correction data "ta" to "td" stored in the memory 5 is read out by the control circuit of the printer itself or by the control circuit 6 provided within the print head, and is fed to the driving IC "a", where, with the Y position correction data storage circuit 13 alone kept in a writable state, for each data signal, one bit after another of the correction data is stored therein by repeating write operation four times. In this way, the correction data is written to the Y position correction data storage circuit 13.

Now, with reference to FIG. 10, the configuration of the driving IC "a" configured as described above will be described in more detail. It is to be noted that, for simplicity's sake, FIG. 10 gives only a circuit block diagram of the portion of the driving IC "a" related to the output terminal DO1. The portions related to the other output terminals DO2 to DO192 are configured in similar manners, and therefore their explanations will be omitted.

The latch circuit 12 is a latch circuit capable of storing 192-bit data signals. In synchronism with the load signal, the 192-bit data signals stored in the shift register 11 are fed to the latch circuit 12. Simultaneously, in synchronism with the load signal, the 192-bit data signals stored in the latch circuit 12 are fed to the select circuit 15. The select circuit 15 includes 192 gate circuits each composed of four AND gates G11 to G14 and one OR gate G15.

The select circuit 15 feeds the data signals to the drive circuit 16 in synchronism with one, at a time, of the lighting timing signals EN1 to EN4 generated by a delay control circuit 18. To achieve this, the select circuit 15 includes 192 AND gates G7 to which the data signals output from the latch circuit 12 and the outputs of the corresponding OR gates G15 are fed respectively. The shift register 11, the drive circuit 16, the current supply circuit 17, and the delay control circuit 18 are configured in the same manner as in the first embodiment (FIG. 4).

Specifically, four bits of correction data "ta" to "td" output from the Y position correction data storage circuit 13 are fed to the four AND gates G11 to G14. These AND gates G11 to G14 also receive respectively the lighting timing signals EN1 to EN4 generated by the delay control circuit 18. The outputs of the AND gates G11 to G14 are fed to the OR gate G15. Thus, the OR gate G15 outputs the output of that AND gate which receives whichever of the correction data bits "ta" to "td" is high. Thus, the data signals output from the latch circuit 12 are fed through the AND gate G7 to the current amplifier 16a in synchronism with whichever of the lighting timing signals EN1 to EN4 is selected according to the correction data "ta" to "td."

Figure 11:
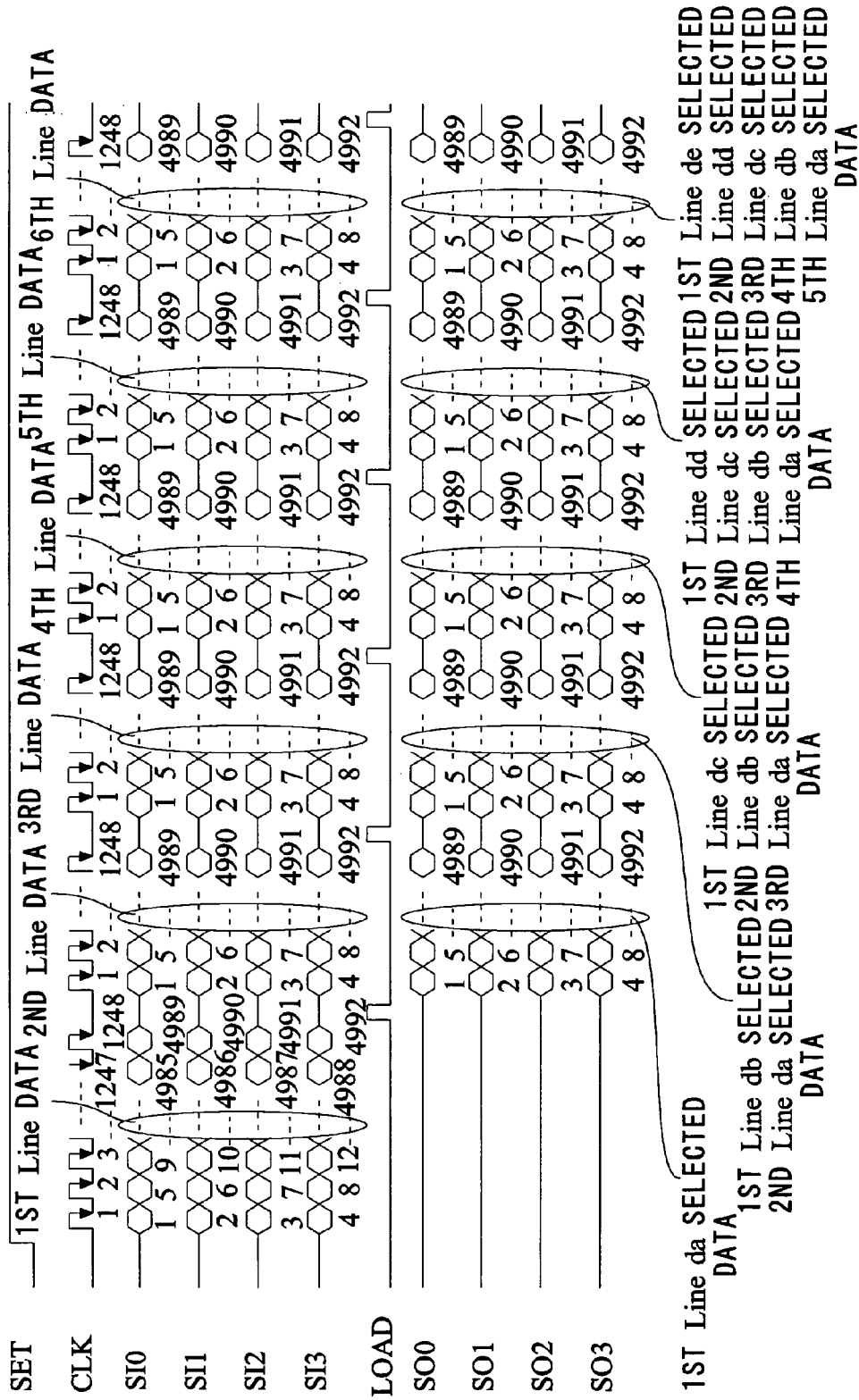
FIG. 11 is a timing chart showing the operation of the control circuit shown in FIG. 9.
Figure 12:
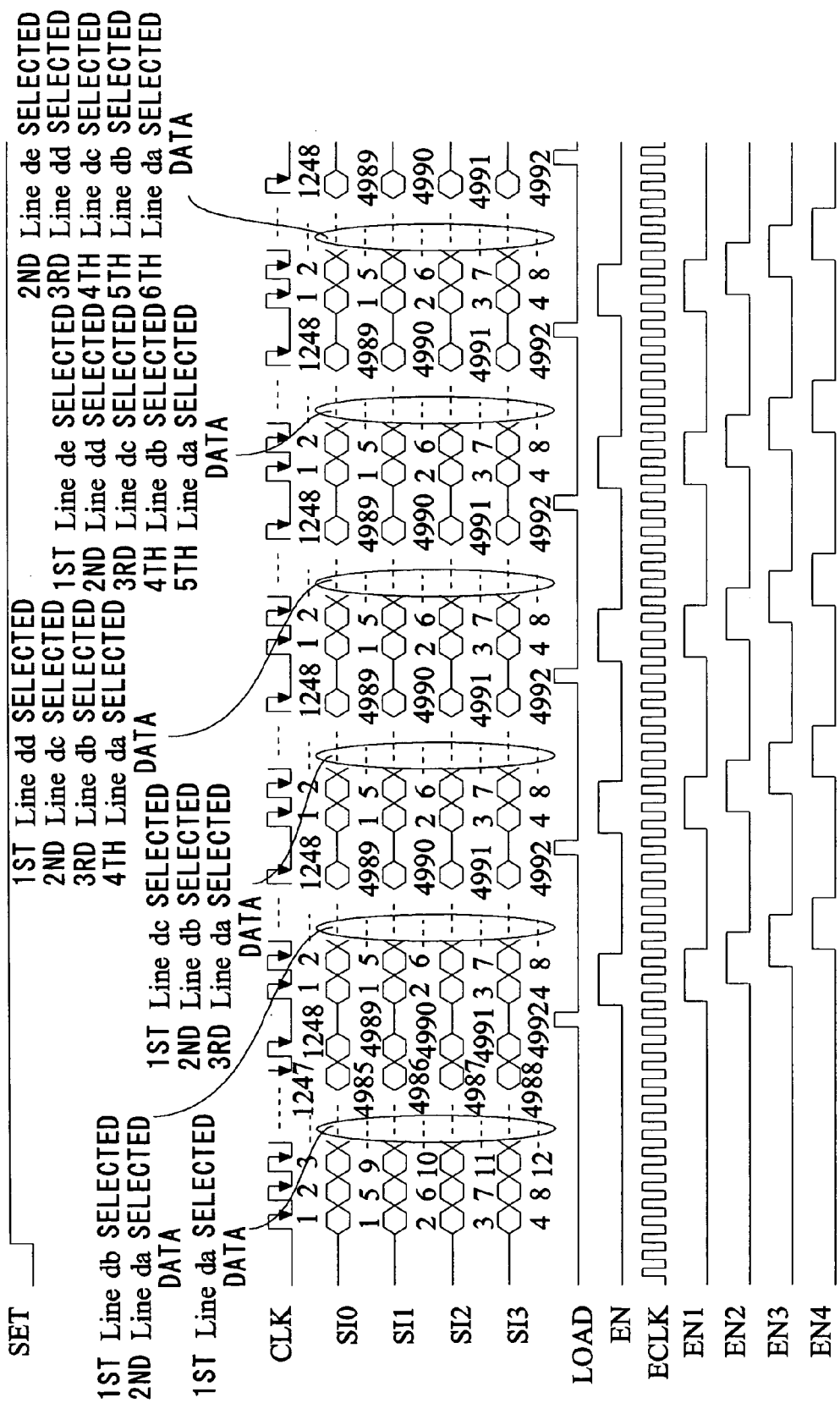
FIG. 12 is a timing chart showing the operation of the driving IC shown in FIG. 10.

Now, the operation of the optical print head incorporating the control circuit 6 and the driving ICs "a1" to "a26" each configured as described above will be described with reference to FIGS. 7A to 7E, 11, and 12. FIG. 11 is a timing chart showing the operation of the control circuit, and FIG. 12 is a timing chart showing the operation of the driving ICs.

First, the operation of the control circuit 6 will be described with reference to the timing chart shown in FIG. 11. For example, at start-up or the like, the correction data bits "da" to "de" set in the same manner as in the first embodiment are read out from the memory 5 by the control circuit of a printer itself or by the control circuit 6 provided within the print head, and are stored, through the shift register 21, in the Y position correction data storage circuit 23. When the correction data stored in the memory 5 has previously been written to the Y position correction data storage circuit 23 in this way, first, a set signal SET turns from low to high to inhibit writing to the Y position correction data storage circuit 23.

Then, data signals corresponding to 1 line (4,992 bits) are fed in, in units of four bits and one unit after the next, and are taken in by the shift registers 21 of the control circuit 6 in synchronism with pulses in the clock CLK. When 1,248 clock pulses CLK have been fed in, the data signals corresponding to the first line are stored in the shift register 21. When the data signals of the first line have been stored in the shift register 21 in this way, the clock CLK ceases to be fed in, and a high level is fed in as the load signal LOAD.

In synchronism with the load signal LOAD, the data signals of the first line stored in the shift register 21 are written to the latch circuit 22a. The data signals written to the latch circuit 22a are fed only through the AND gates GI to which the correction data bit "da" is fed and then through the corresponding OR gates G6 to the shift register 25. Thus, of the data signals of the first line stored in the latch circuit 22a, only those to be fed to the light-emitting sections located in the position corresponding to the correction data bit "da" (i.e., those located close to the reference position) are fed from the latch circuit 22a to the shift register 25.

Subsequently, the load signal LOAD is turned low, and then another 1,248 clock pulses CLK start being fed in. Concurrently, the data signals stored in the shift register 25 so as to be fed to the light-emitting sections located close to the reference position of the first line are fed out, in units of four bits, via the data output terminals SO0 to SO3 so as to be fed to the data input terminals SI0 to SI3 of the driving IC "a26." Thus, of the data signals corresponding to the first line, the 1st to 192nd data signals, the 193rd to 384th data signals, . . . , and the 4,801st to 4,992nd data signals are stored in the shift registers 11 of the driving ICs "a1," "a2," . . . , and "a26" respectively. Concurrently, the data signals corresponding to the second line are fed to the shift register 21.

Then, a high level is fed in again as the load signal LOAD. This causes the data signals of the first line stored in the latch circuit 22a to be written to the latch circuit 22b, and simultaneously the data signals of the second line stored in the shift register 11 to be written to the latch circuit 22a. The data signals of the second line thus stored in the latch circuit 22a are fed through the AND gates G1 to which the correction data bit "da" is fed and then through the corresponding OR gates G6 to the shift register 25, and the data signals of the first line stored in the latch circuit 22b are fed through the AND gates G2 to which the correction data bit "db" is fed and then through the corresponding OR gates G6 to the shift register 25.

As a result, the data signals to be fed to the light-emitting sections located close to the reference position of the second line and those to be fed to the light-emitting sections located in the position deviated one line from the reference position of the first line are stored in the shift register 25. When clock pulses CLK start being fed in again, the data signals thus stored in the shift register 25 are fed out, in units of four bits, via the data output terminals SO0 to SO3 so as to be fed to the data input terminals SI0 to SI3 of the driving IC "a26."

Thereafter, the clock CLK and the load signal LOAD repeat behaving in the manner described above and thereby achieve the following operations. First, the data signals corresponding to the third, second, and first lines are stored in the latch circuits 22a, 22b, and 22c respectively. Then, the data signals to be fed to the light-emitting sections located in positions deviated roughly two lines from the reference position of the first line, those located in position deviated roughly one line from the reference position of the second line, and those located close to the reference position of the third line are stored in the shift register 25.

Next, after the data signals stored in the shift register 25 are fed out via the data output terminals SO0 to SO3 so as to be fed to the data input terminals SI0 to SI3 of the driving IC "a26," the data signals corresponding to the fourth, third, second, and first lines are stored in the latch circuits 12a, 12b, 12c, and 12d respectively. Then, the data signals to be fed to the light-emitting sections located in positions deviated roughly three lines from the reference position of the first line, those located in position deviated roughly two lines from the reference position of the second line, those located in position deviated roughly one line from the reference position of the third line, and those located close to the reference position of the fourth line are stored in the shift register 25.

Next, after the data signals stored in the shift register 25 are fed out via the data output terminals SO0 to SO3 so as to be fed to the data input terminals SI0 to SI3 of the driving IC "a26," the data signals corresponding to the fifth, fourth, third, second, and first lines are stored in the latch circuits 12a, 12b, 12c, 12d, and 12e respectively. Then, the data signals to be fed to the light-emitting sections located in positions deviated roughly four lines from the reference position of the first line, those located in position deviated roughly three lines from the reference position of the second line, those located in position deviated roughly two lines from the reference position of the third line, those located in position deviated roughly one line from the reference position of the fourth line, and those located close to the reference position of the fifth line are stored in the shift register 25.

The control circuit 6 repeats these operations, with the result that the driving ICs "a1" to "a26" receive data signals that have been corrected for deviations due to a Y bend among different lines according to the correction data bits "da" to "de." Specifically, in a case where the light-emitting sections #1 to #17 exhibit a Y bend as shown in FIG. 7A, when the shift register 25 of the control circuit 6 outputs the data signal of the first line to be fed to the light-emitting section #8, it outputs along with it the data signals of the second line to be fed to the light-emitting sections #5 to #7, #9, and #10, the data signals of the third line to be fed to the light-emitting sections #3, #4, #11, and #12, the data signals of the fourth line to be fed to the light-emitting sections #1, #2, #13, and #14, and the data signals of the fifth line to be fed to the light-emitting sections #15 to #17. Thus, when the light-emitting sections #1 to #17 are lit by the use of the data signals output from the control circuit 6, their Y bend is corrected as shown in FIG. 7C.

Next, the operation of the driving ICs "a1" to "a26" will be described with reference to the timing chart shown in FIG. 12. For example, at start-up or the like, the correction data bits "ta" to "td" set in the same manner as in the first embodiment are read out from the memory 5 by the control circuit of the printer itself or by the control circuit 6 provided within the print head, and are stored, through the shift register 11, in the Y position correction data storage circuit 13. When the correction data stored in the memory 5 has previously been written to the Y position correction data storage circuit 13 in this way, first, the set signal SET turns from low to high to inhibit writing to the Y position correction data storage circuit 13.

Then, data signals corresponding to 1 line (4,992 bits) are fed, in units of four bits and one unit after the next, to the data input terminals SI0 to SI3 of the driving IC "a26"

located at an end, and those data signals are taken in by the shift registers 11 of the driving ICs "a1" to "a26" in synchronism with pulses in the clock CLK. When the 1,248th clock pulse CLK is fed in, of the data signals selected from five consecutive lines, the 1st to 192nd data signals, the 193rd to 384th data signals, . . . , and the 4,801st to 4,992nd data signals are stored in the shift registers 11 of the driving ICs "a1," "a2," . . . , and "a26" respectively. When the data signals selected from five consecutive lines have been stored in the shift registers 11 of the driving ICs "a1" to "a26" in this way, the clock CLK ceases to be fed in, and a high level is fed in as the load signal LOAD.

In synchronism with the load signal LOAD, in each of the driving ICs "a1" to "a26," the data signals stored in the shift register 11 are written to the latch circuit 12. The data signals written to the latch circuit 12 is fed to the AND gate G7. Subsequently, the load signal LOAD is turned low, and then the clock CLK starts being fed in again at the same time that a pulse signal that remains high for a predetermined period is fed in as the timing signal EN. This causes the delay control circuit 18 to output the lighting timing signals EN1 to EN4 in the order EN1, then EN2, then EN3, and then EN4 as described with reference to FIG. 5.

As a result, first, the lighting timing signal EN1 is fed through the AND gates G11 to which the correction data bit "ta" is fed and then through the corresponding OR gates G15 to the corresponding AND gates G7, and thus the data signals to be fed to the light-emitting sections located close to the reference position of the respective line are fed to the drive circuit 16. Next, with a delay equal to one period of the timing clock ECLK, the lighting timing signal EN2 is fed through the AND gates G12 to which the correction data bit "tb" is fed and then through the corresponding OR gates G15 to the corresponding AND gates G7. Thus, the data signals to be fed to the light-emitting sections located in the position deviated (¼)L from the reference position of the respective line are fed to the drive circuit 16.

Next, with a delay equal to one period of the timing clock ECLK, the lighting timing signal EN3 is fed through the AND gates G13 to which the correction data bit "tc" is fed and then through the corresponding OR gates G15 to the corresponding AND gates G7. Thus, the data signals to be fed to the light-emitting sections located in the position deviated (½)L from the reference position of the respective line are fed to the drive circuit 16.

Lastly, with a delay equal to one period of the timing clock ECLK, the lighting timing signal EN4 is fed through the AND gates G14 to which the correction data bit "td" is fed and then through the corresponding OR gates G15 to the corresponding AND gates G7. Thus, the data signals to be fed to the light-emitting sections located in the position deviated (¾)L from the reference position of the respective line are fed to the drive circuit 16. Concurrently, in synchronism with clocks in the pulse CLK, the data signals output from the control circuit 6 are taken in by the shift register 11 of the driving IC "a."

The driving ICs "a1" to "a26" repeat these operations to control the light emission of the individual light-emitting sections #1 to #4992 while correcting deviations due to a Y bend among different regions between adjacent lines.

Specifically, in a case where the control circuit 6 corrects the data signals fed to the light-emitting sections #1 to #17 located as shown in FIG. 7A, after the data signal of the first line to be fed to the light-emitting section #8 is fed from the control circuit 6 and stored in the latch circuit 12, first, when the delay control circuit 18 outputs the lighting timing signal EN1, the light-emitting section #8 receives the data signal of the first line, the light-emitting sections #5 and #10 receive the data signals of the second line, the light-emitting sections #3 and #12 receive the data signals of the third line, and the light-emitting sections #1 and #14 receive the data signals of the fourth line, and the light-emitting section #17 receives the data signal of the fifth line.

Next, when the delay control circuit 18, after outputting the lighting timing signal EN1, outputs the lighting timing signal EN2 with a delay equal to one period of the timing clock, the light-emitting section #6 receives the data signal of the second line and the light-emitting section #16 receives the data signal of the fifth line.

Next, when the delay control circuit 18, after outputting the lighting timing signal EN2, outputs the lighting timing signal EN3 with a delay equal to one period of the timing clock, the light-emitting section #9 receives the data signal of the second line, the light-emitting sections #4 and #11 receive the data signals of the third line, and the light-emitting sections #2 and #13 receive the data signals of the fourth line.

Lastly, when the delay control circuit 18, after outputting the lighting timing signal EN3, outputs the lighting timing signal EN4 with a delay equal to one period of the timing clock, the light-emitting section #7 receives the data signal of the second line and the light-emitting section #15 receives the data signal of the fifth line.

Thus, when the light-emitting sections #1 to #17 are lit by the driving IC "a" by the use of data signals corrected for a Y bend as shown in FIG. 7C by the control circuit 6, it is possible to correct the Y bend with higher accuracy as shown in FIG. 7E. Making the control circuit correct deviations due to a Y bend among different lines helps simplify the circuit configuration of the driving IC "a," and thus helps make it more compact than in the first embodiment.

<Third Embodiment>

Figure 13:
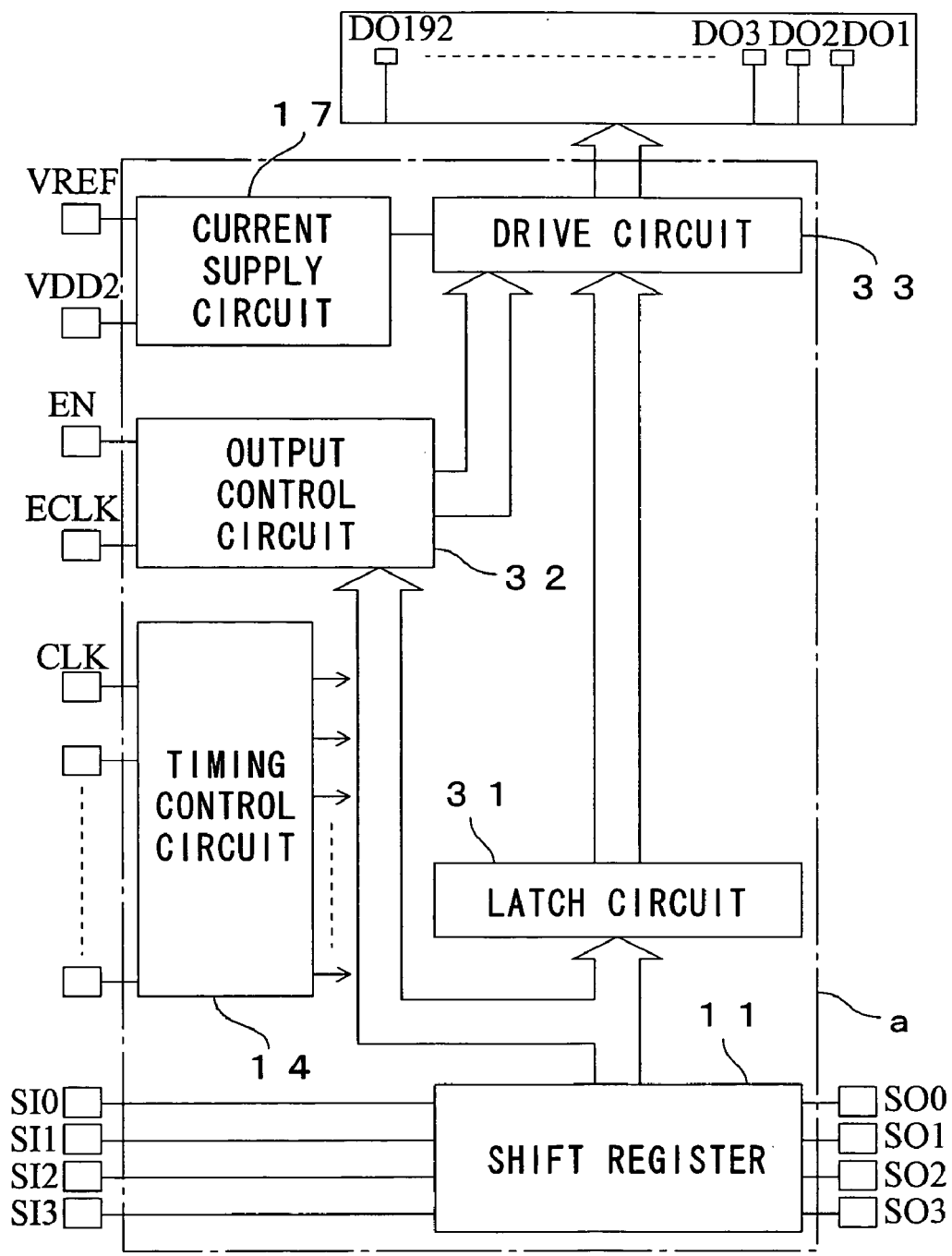
FIG. 13 is a block circuit diagram showing the internal configuration of the driving IC provided in the optical print head of a third embodiment of the invention.

Now, a third embodiment of the invention will be described with reference to the drawings. FIG. 13 is a block circuit diagram showing the internal configuration of the driver IC provided in the optical print head of this embodiment. In FIG. 13, such circuit elements as serve the same purposes as in FIG. 3 are identified with the same reference numerals and symbols, and their detailed explanations will not be repeated.

In this embodiment, the driving IC "a" provided in the optical print head configured as shown in FIG. 2 is composed of, as shown in the block diagram of FIG. 13, a shift register 11, a timing control circuit 14, a current supply circuit 17, a latch circuit 31 that takes in, parallelly in units of 192 bits, the data signals taken in by the shift register 11 and that outputs them after roughly correcting them in the Y direction, an output control circuit 32 that controls a drive circuit 33 to finely correct the data signals in the Y direction, and a drive circuit 33 that outputs drive signals to output terminal DO1 to DO192 on the basis of data signals fed from the latch circuit and timing that is controlled by the output control circuit 32.

Assuming that the driving IC "a" is configured as shown in FIG. 13, the latch circuit 31 is composed of five stages of 192-bit latch circuits connected in series and a latch control circuit that feeds the latch circuit of each stage with control signals on a bit-by-bit basis. The latch circuit constituting each stage of the latch circuit 31 parallelly receives 192-bit data signals output from the shift register 11. On the other hand, in the latch control circuit is stored 192×5-bit correction data with which to individually control the operation of 192-bit flip-flop circuits (described later) provided in the latch circuit of each stage by feeding it control signals on a bit-by-bit basis.

In this way, the latch operation of the latch circuit constituting each stage of the latch circuit 31 is controlled by the latch control circuit on a bit-by-bit basis, and thus the data signals fed from the shift register 11 are output with delays different from one bit to another. The correction data that is stored in the latch control circuit for the control of the latch operation of the latch circuit of each stage provided in the latch circuit 31 can be written thereto in advance through the shift register 11.

As will be described later, the output control circuit 32 is composed of 192-bit output delay counters that determine output timing individually for the output terminals and a counter control circuit that feeds the output delay counters individually with control signals. The delay counters can each produce a delay equal to up to four periods of the clock, and accordingly 192×4-bit correction data is stored in the counter control circuit.

Thus, in the output control circuit 32, the individual delay counters give a lighting timing signal EN different delays according to the timing set individually for the output terminals DO1 to DO192, and output the thus differently delayed lighting timing signals to the drive circuit 33. Here, the timing for each of the output terminals DO1 to DO192 is determined according to the correction data stored in the counter control circuit. The correction data stored in the counter control circuit can be written thereto in advance through the shift register 11.

As in the first embodiment, the drive circuit 33 has 192 current amplifier circuits 16a that feed output currents to the output terminals and 192 AND gates G7 like those provided in the select circuit 15 within the driving IC "a" in the first embodiment. The AND gates G7 receive the data signals output from the latch circuit 31 and the delayed lighting timing signals output from the output control circuit 32.

The outputs of the AND gates G7 are fed to the current amplifier circuits 16a, and thus the data signals output from the latch circuit 31 are fed to the current amplifier circuits 16a with timing corresponding to the lighting timing signals output from the output control circuit 32. Accordingly, the current amplifier circuits 16a feed currents to the output terminals with timing determined by the data signals and the lighting timing signals.

Figure 14:
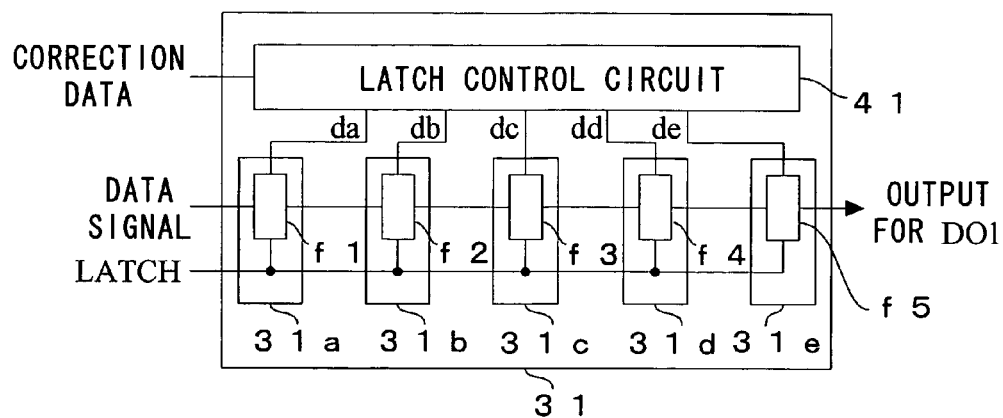
FIG. 14 is a block diagram showing the internal configuration of the latch circuit used in the driving IC shown in FIG. 13.

Now, the latch circuit 31 and the output control circuit 32 used in the driving IC "a" configured as described above will be described in more detail. First, the configuration of the latch circuit 31 will be described with reference to FIG. 14. It is to be noted that, for simplicity's sake, FIG. 14 gives only a circuit block diagram of the portion of the latch circuit 31 related to the output terminal DO1. The portions related to the other output terminals DO2 to DO192 are configured in similar manners, and therefore their explanations will be omitted.

In the latch circuit 31 shown in FIG. 14, the individual latch circuits 31a to 31e are each composed of 192 flip-flop circuits, and, for each of the output terminals, the corresponding one of the flip-flop circuits provided in each of the latch circuits 31a to 31e are connected together so that the latch circuits 31a to 31e are connected together in series as a whole. Accordingly, the 192 data signals from the shift register 11 are parallelly fed to the individual latch circuits 31a to 31e. Moreover, as described earlier, in the latch circuit 31 is also provided the latch control circuit 41 that feeds each of the flip-flop circuits provided in the latch circuits 31a to 31e with a control signal. To feed 192×5 control signals individually to the flip-flop circuits, the latch control circuit 41 has 192×5-bit correction data stored therein for use as the control signals.

Specifically, as shown in FIG. 14, for the output terminal DO1, the latch circuits 31a to 31e include flip-flop circuits "f1" to "f5," respectively. The data signal from the shift register 11 for the output terminal DO1 is fed to the flip-flop circuit "f1," the output of the flip-flop circuit "f1" is fed to the flip-flop circuit "f2," the output of the flip-flop circuit "f2" is fed to the flip-flop circuit "f3," the output of the flip-flop circuit "f3" is fed to the flip-flop circuit "f4," and the output of the flip-flop circuit "f4" is fed to the flip-flop circuit "f5." The output of the flip-flop circuit "f5" is fed to the AND gate G7 provided in the drive circuit 33.

Figure 15:
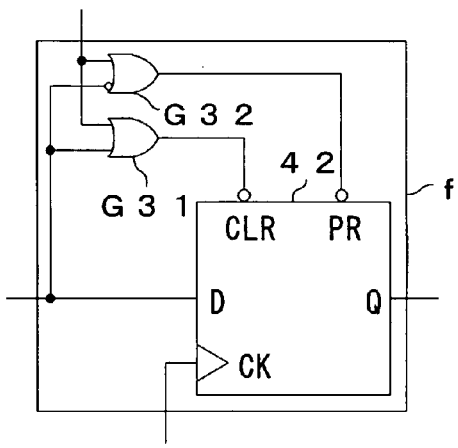
FIG. 15 is a block circuit diagram showing the internal configuration of the flip-flop circuit.

As shown in FIG. 15, these flip-flop circuits "f1" to "f5" are each composed of a D flip-flop 42 and two OR gates G31 and G32. The data signal output from the shift register 11 or from the output terminal Q of the D flip-flop of the latch circuit of the previous stage is fed to the input terminal D of the D flip-flop 42, to one input terminal of the OR gate G31, and to one input terminal, an inverting input terminal, of the OR gate G32. Moreover, the corresponding correction data from the latch control circuit 41 is fed to the other input terminal of each of the OR gates G31 and G32, and a latch signal LATCH is fed to the clock terminal CK of the D flip-flop 42. Furthermore, the output of the OR gate G31 is fed to the clear terminal CLR of the D flip-flop 42, and the output of the OR gate G32 is fed to the preset terminal PR of the D flip-flop 42.

Here, the D flip-flop 42 operates as follows. When the D flip-flop 42 is receiving a high signal at both its clear and preset terminals CLR and PR, it performs latch operation in synchronism with the latch signal LATCH fed to its clock terminal CK. When the D flip-flop 42 is receiving a high signal at its clear terminal CLR and a low signal at its preset terminal PR, it outputs a high signal at its output terminal Q irrespective of the input level at its input terminal D. When, the D flip-flop 42 is receiving a low signal at its clear terminal CLR and a high signal at its preset terminal PR, it outputs a low signal at its output terminal Q irrespective of the input level at its input terminal D.

Thus, when the correction data fed from the latch control circuit 41 as a control signal is high, the OR gates G31 and G32 both output a high level. This makes the inputs to the clear and preset terminals CLR and PR of the D flip-flop 42 high, and thus the D flip-flop 42 performs latch operation on the data signal fed to its input terminal D according to the latch signal LATCH fed to its clock terminal CK.

When the correction data fed from the latch control circuit 41 as a control signal is low, and in addition the data signal fed to the input terminal D of the D flip-flop 42 is high, the input from the OR gate G31 to the clear terminal CLR is high, and the input from the OR gate G32 to the preset terminal PR is low. Accordingly, the output of the D flip-flop 42 at its output terminal Q is high; that is, the D flip-flop 42 outputs a signal having the same level as the data signal fed to its input terminal D.

When the correction data fed from the latch control circuit 41 as a control signal and the data signal fed to the input terminal D of the D flip-flop 42 are both low, the input from the OR gate G31 to the clear terminal CLR is low, and the input from the OR gate G32 to the preset terminal PR is high. Accordingly, the output of the D flip-flop 42 at its output terminal Q is low; that is, the D flip-flop 42 outputs a signal having the same level as the data signal fed to its input terminal D.

In other words, when the correction data output from the latch control circuit 41 is high, the flip-flop circuit "f" (corresponding to the flip-flop circuits "f1" to "f5") that receives this correction data performs latch operation on the data signal fed thereto according to the latch signal LATCH. On the other hand, when the correction data output from the latch control circuit 41 is low, the flip-flop circuit "f" that receives this correction data performs through operation, outputting the data signal fed thereto intact.

The latch control circuit 41, which feeds control signals to the latch circuits 31a to 31e provided with the flip-flop circuits "f1" to "f5," has correction data bits "da" to "de" stored therein. Thus, the OR gates G31 and G32 provided in the flip-flop circuits "f1" to "f5" receive "da" to "de," respectively, as correction data. That is, when the correction data bits (da, db, dc, dd, de) have the relationship (H, L, L, L, L), no line correction is performed at the light-emitting section for which that correction data is fed to the flip-flop circuits "f1" to "f5." Here, "H" represents a high level, and "L" represents a low level.

When the correction data bits are (H, H, L, L, L), line correction by one line is performed; when the correction data bits are (H, H, H, L, L), line correction by two lines is performed; when the correction data bits are (H, H, H, H, L), line correction by three lines is performed; when the correction data bits are (H, H, H, H, H), line correction by four lines is performed. For each of the output terminals DO1 to DO192, such correction data "da" to "de" is fed through the shift register 11 to the latch control circuit 41, where the correction data is stored.

Figure 16:
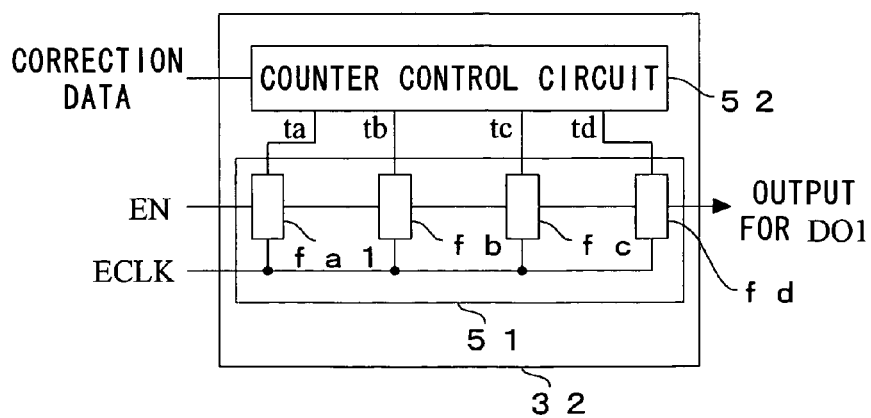
FIG. 16 is a block diagram showing the internal configuration of the output control circuit provided in the driving IC shown in FIG. 13.
Figure 17:
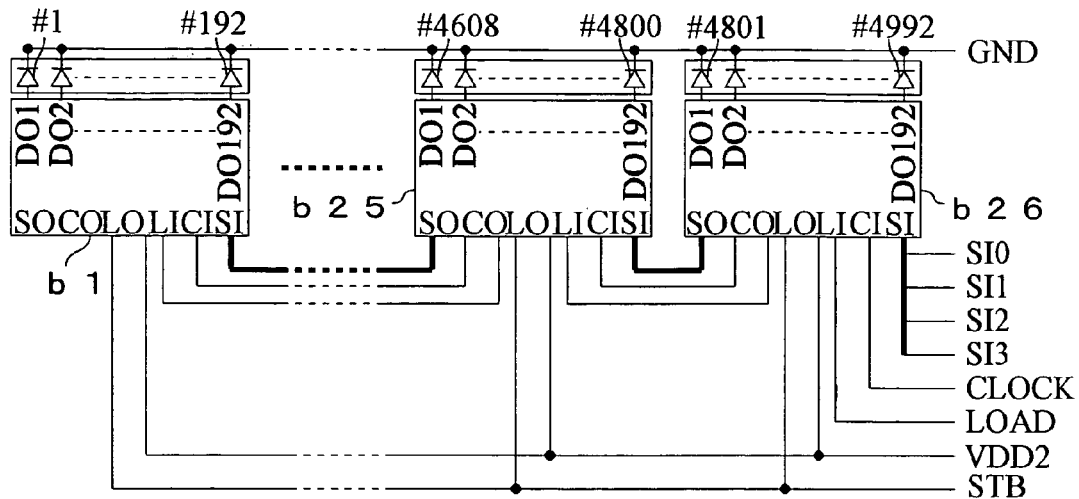
FIG. 17 is a block circuit diagram showing the internal configuration of a conventional driving IC.
Figure 18:
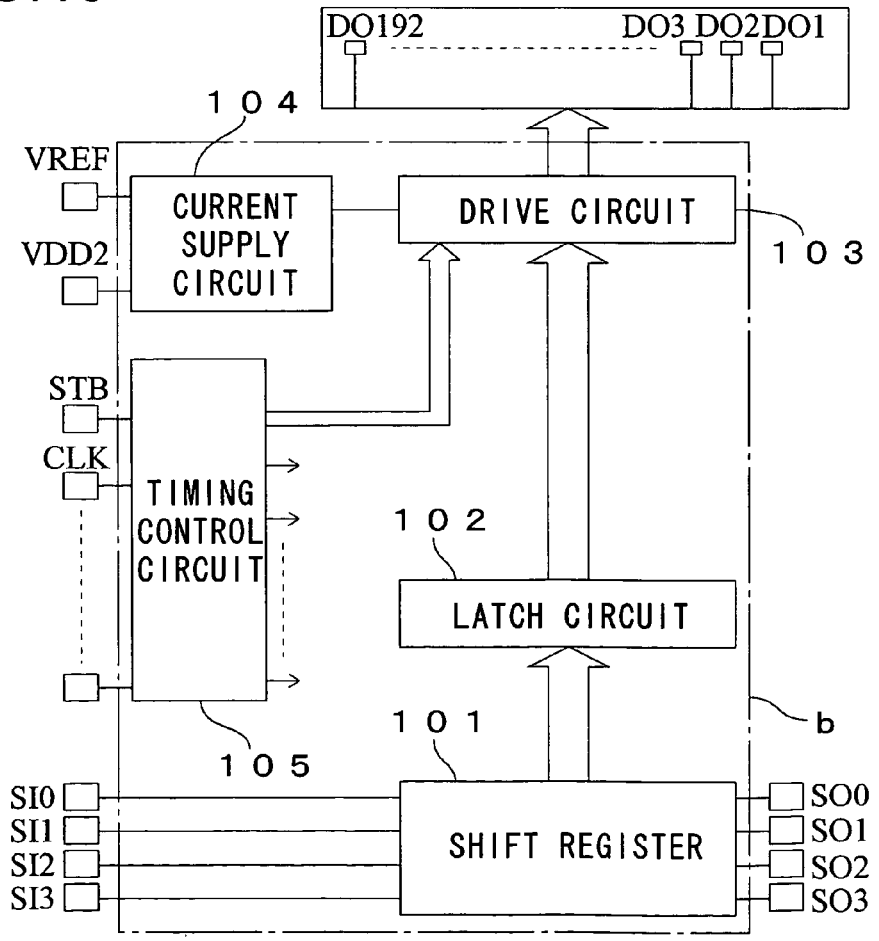
FIG. 18 is a block diagram showing the internal configuration of a conventional optical print head.
Figure 19:
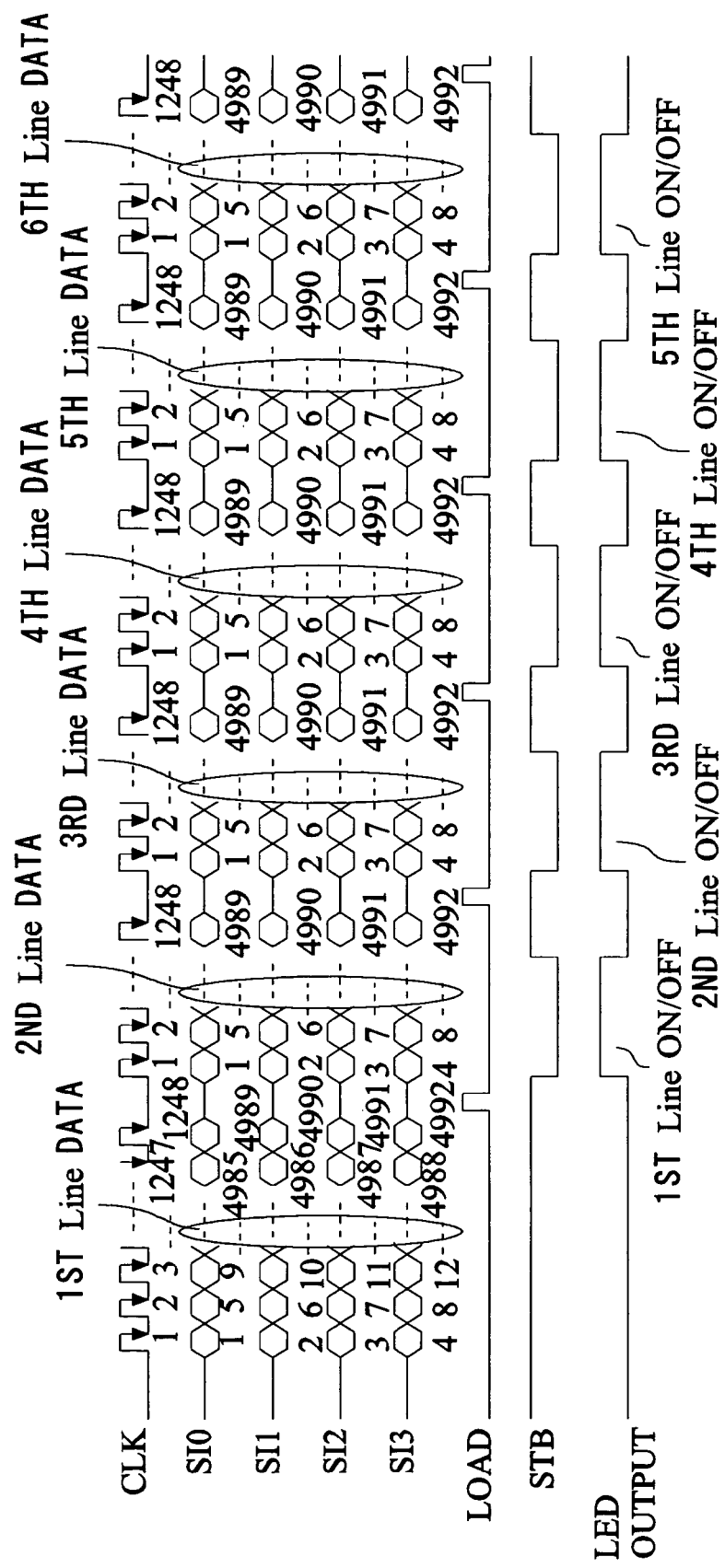
FIG. 19 is a timing chart showing the operation of a conventional optical print head.
Figure 20:
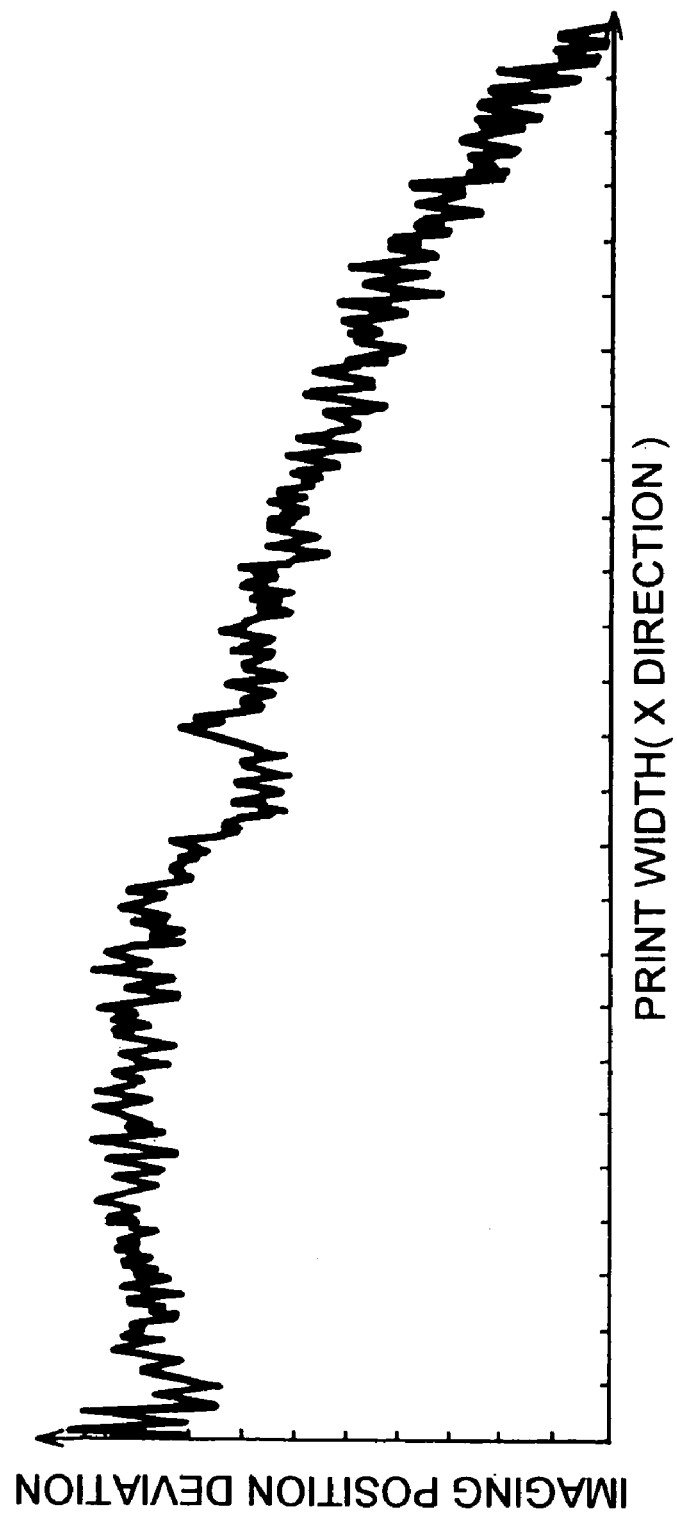
FIG. 20 is a diagram showing deviations of Y positions observed in a print made with a conventional optical print head.
Figure 21:
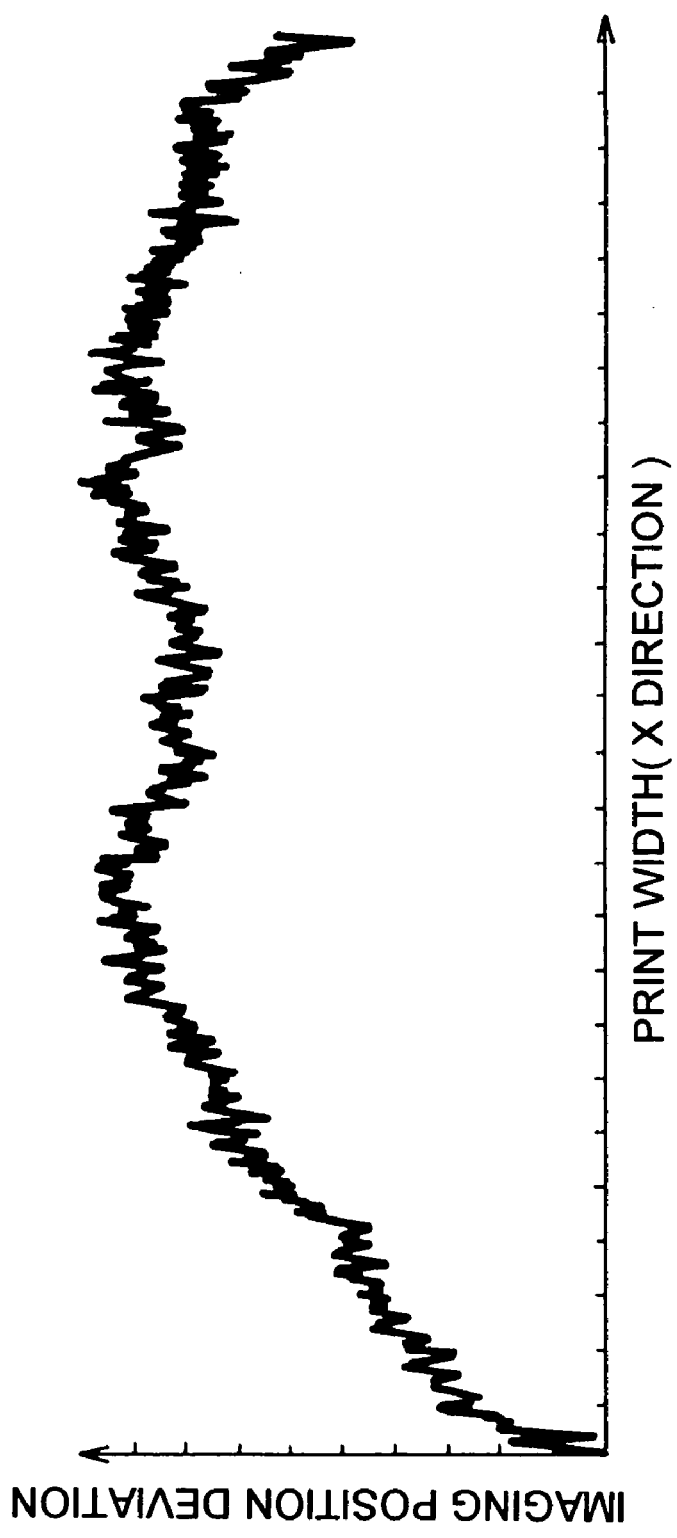
FIG. 21 is a diagram showing deviations of Y positions observed in a print made with a conventional optical print head.

Next, the configuration of the output control circuit 32 will be described with reference to FIG. 16. It is to be noted that, for simplicity's sake, FIG. 16 gives only a circuit block diagram of the portion of the output control circuit 32 related to the output terminal DO1. The portions related to the other output terminals DO2 to DO192 are configured in similar manners, and therefore their explanations will be omitted.

In the output control circuit 32 shown in FIG. 16, when the lighting timing signal EN is fed to an output delay counter 51, it is output to the AND gate G7 provided in the drive circuit 33 with the timing set exclusively for the output terminal DO1. Here, only the output delay counter 51 for the output terminal DO1 is illustrated, but, in reality, output delay counters are provided also one for each of the output terminals DO2 to DO192. The output delay counter 51 operates in synchronism with the timing clock ECLK.

The delay counter 51 gives the lighting timing signal EN a delay according to correction data fed, as control signals, from a counter control circuit 52. Here, it is assumed that each delay counter 51 can produce a delay equal to up to four periods of the timing clock ECLK. The counter control circuit 52 receives, through the shift register 11, 4-bit correction data "ta" to "td" common within one-chip driving IC "a," and has 192×4-bit correction data stored therein.

The output delay counter 51 is composed of flip-flop circuits "fa" to "fd" connected in series and each configured as shown in FIG. 15. The flip-flop circuits "fa" to "fd" receive from the counter control circuit 52 correction data bits "ta" to "td," respectively, as control signals.

Thus, when the correction data bits (ta, tb, tc, td) have the relationship (H, L, L, L), the lighting timing signal EN is output with a delay equal to one period. Likewise, the lighting timing signal EN is output with a delay equal to two periods of the timing clock ECLK when the correction data bits (ta, tb, tc, td) have the relationship (H, H, L, L), with a delay equal to three periods of the timing clock ECLK when the correction data bits (ta, tb, tc, td) have the relationship (H, H, H, L), and with a delay equal to four periods of the timing clock ECLK when the correction data bits (ta, tb, tc, td) have the relationship (H, H, H, H).

When 192 sets of such 4-bit correction data (ta, tb, tc, td) are fed through the shift register 11 to the counter control circuit 52, they are written within the counter control circuit 52.

Now, how data signals are transferred while the latch circuit 31 and the output control circuit 32 are operating as described above will be described, as in the first embodiment, with reference to FIGS. 7A to 7E. In FIGS. 7A to 7E, "da," "db," "dc," "dd," and "de" indicate the states in which the correction data (da, db, dc, dd, de) have the relationships (H, L, L, L, L), (H, H, L, L, L), (H, H, H, L, L), (H, H, H, H, L), and (H, H, H, H, H), respectively. Moreover, in FIGS. 7A to 7E, "ta," "tb," "tc," and "td" indicate the states in which the correction data (ta, tb, tc, td) have the relationships (H, L, L, L), (H, H, L, L), (H, H, H, L), and (H, H, H, H), respectively.

When there are deviations in Y positions as shown in FIG. 7A, the operation of the latch circuits 31a to 31e of the individual stages provided within the latch circuit 31 is controlled with correction data as shown in FIG. 7B fed from the latch control circuit 41 for the light-emitting sections #1 to #17. Specifically, when the data signals of the first line to be fed to the light-emitting section #8 are output from the last-stage latch circuit 31e of the latch circuit 31 to the drive circuit 33, output along with them are the data signals of the second line to be fed to the light-emitting sections #5 to #7, #9, and #10, the data signals of the third line to be fed to the light-emitting sections #3, #4, #11, and #12, the data signals of the fourth line to be fed to the light-emitting sections #1, #2, #13, and #14, and the data signals of the fifth line to be fed to the light-emitting sections #15 to #17. Thus, when the light-emitting sections #1 to #17 are lit by the use of the data signals output from the latch circuit 31, their Y bend is corrected as shown in FIG. 7C.

Moreover, the operation of the output delay counters 51 provided within the output control circuit 32 one for each of the light-emitting sections #1 to #17 is controlled with correction data as shown in FIG. 7D fed from the counter control circuit 52. Specifically, the output control circuit 32 feeds the drive circuit 33 with, first, the lighting timing signal EN for the light-emitting sections #1, #3, #5, #8, #10, #12, #14, and #17, then the lighting timing signal EN for the light-emitting sections #6 and #16, then the lighting timing signal EN for the light-emitting sections #2, #4, #9, #11, and #13, and then the lighting timing signal EN for the light-emitting sections #7 and #15.

As the result of the latch circuit 31 and the output control circuit 32 feeding data signals and lighting timing signals, respectively, to the drive circuit 33 in this way, first the light-emitting section #8 receives the data signal of the first line, the light-emitting sections #5 and #10 receive the data signals of the second line, the light-emitting sections #3 and #12 receive the data signals of the third line, and the light-emitting section #17 receives the data signal of the fourth line.

Next, with a delay equal to one period of the timing clock ECLK, the light-emitting section #6 receives the data signal of the second line, and the light-emitting section #16 receives the data signal of the fifth line. Subsequently, with a further delay equal to one period of the timing clock ECLK, the light-emitting section #9 receives the data signal of the second line, the light-emitting sections #4 and #11 receive the data signals of the third line, and the light-emitting sections #2 and #13 receive the data signals of the fourth line. Lastly, with a further delay equal to one period of the timing clock ECLK, the light-emitting section #7 receives the data signal of the second line, and the light-emitting section #15 receives the data signal of the fifth line.

In the driving ICs "a1" to "a26" each provided with the latch circuit 31 and the output control circuit 32 that operate as described above, the relevant signals behave as shown in FIG. 8 as in the first embodiment. However, as opposed to in the first embodiment, in this embodiment, the data signals to be fed to the individual light-emitting sections are output from the last-stage latch circuit 31e of the latch circuit 31 as a result of the flip-flop circuit "f" being controlled between latch and through operation, and the lighting timing signals to be fed to the individual light-emitting sections are output from the individual output delay counters of the output control circuit 32. This makes it possible to omit the select circuit that is used in the first embodiment to select the data signals and the lighting timing signals to be fed to the individual light-emitting sections.

In the first to third embodiments, there are provided 4,992 light-emitting sections, each driving IC has 192 output terminals, and Y positions are corrected among five lines and among four regions between adjacent lines. This should not be understood, however, to impose any restriction on those numbers. The numbers of lines and regions among which to correct Y positions may vary according to the rate at which paper is fed and the rate at which light-emitting sections are blinked. It is also possible to store in a memory a plurality of sets of correction data for different paper feed rates and different light-emitting section blink rates so that an appropriate set of correction data is read out and transferred to driving ICs, for example, at a change of print rates.

The embodiments deal with cases where individual light-emitting sections can be lit with different timing. However, the present invention is applicable also in cases where different groups of light-emitting sections are lit with different timing, or light-emitting sections belonging to different driving ICs are lit with different timing. By lighting light-emitting sections with different timing on a group-by-group basis in this way, it is possible to simplify the circuit configuration of the driving IC.

The driving IC may incorporate, in addition to a Y position correction data storage circuit, a brightness correction data storage circuit for storing data previously prepared for the correction of brightness. In that case, for each light-emitting section, S bits of correction data are stored in the brightness correction data storage circuit, and, for each output terminal of the driving IC by way of which to supply current to the corresponding light-emitting section, S current amplifiers for supplying current are provided. These S current amplifiers are operated according to the S bits of correction data to achieve brightness correction.

The embodiments deal with optical print heads in which the output terminals of a driving IC are connected to light-emitting sections on a one-to-one basis. However, it is also possible, as disclosed in Japanese Patent Applications Laid-Open Nos. H6-163980 and H10-226102, to divide n light-emitting sections into m groups in such a way that the light-emitting sections belonging to one group have one end thereof connected together to a common electrode and that m light-emitting sections belonging to the m different groups have the other end thereof connected together to an individual electrode. In this case, the output terminals of the driving IC are accordingly divided into two groups, namely a group of those connected to common electrodes and a group of those connected to individual electrodes. In this way, the optical print head can be driven on a time-division basis.

Where data signals each consist of a plurality of bits or in other cases, the configurations of shift registers, latch circuits, and other circuits may be modified. For example, a shift register may be configured as a memory of which given portions can be accessed on the basis of addresses.

INDUSTRIAL APPLICABILITY

As described above, in a driving IC embodying the present invention, according to deviations of the imaging positions of a plurality of light-emitting sections of a light-emitting device provided in an optical print head, the timing with which the individual light-emitting sections are lit is varied. An optical print head incorporating such a driving IC can perform printing with improved linearity. Accordingly, a tandem-type printer incorporating a plurality of optical print heads embodying the present invention can perform color printing with smaller color displacements. Moreover, for every print line, different lighting timing signals are produced with different timing so that the individual light-emitting sections are lit in synchronism with whichever of the lighting timing signals is appropriate according to deviations of the imaging positions of the light-emitting sections. This makes it possible to fine-tune the obtained linearity and thereby achieve highly accurate correction.

Moreover, linearity can be improved with almost no mechanical or optical adjustment as practiced conventionally. This helps greatly reduce the trouble and time required for assembly, and helps eliminate the need for strict sorting-out of acceptable components, such as lenses and light-emitting devices, from unusable ones. Thus, it is possible to realize high-quality but inexpensive optical print heads and printers incorporating them.

The invention claimed is:

1. A driving IC for driving elements, comprising:
   a drive circuit that produces drive signals for driving n elements based on n data signals constituting a group of data signals;
   x-stage latch circuits that each store one of x groups of data signals;
   a delay control circuit that produces, by delaying a one-input timing signal or two-input timing signals, y lighting timing signals for determining timing with which data signals corresponding to the individual elements are fed to the drive circuit; and
   a select circuit including a data signal selector that selects the data signals corresponding to the individual elements from the x-stage latch circuits and a timing signal selector that selects lighting timing signals corresponding to the individual elements from the y lighting timing signals produced by the delay control circuit, the select circuit feeding, for each of the elements separately, the data signals selected by the data signal selector to the drive circuit in synchronism with the lighting timing signals selected by the timing signal selector.

2. A driving IC as claimed in claim 1, further comprising:
   a shift register that receives the n data signals in units of m data signals and that then feeds the n data signals parallelly to a first-stage latch circuit among the latch circuits,
   wherein the x-stage latch circuits each feed n data signals parallelly to the latch circuit connected in a stage next thereto.

3. A driving IC as claimed in claim 2, further comprising:
a first storage circuit that stores n latch circuit specifying data signals that represent the latch circuits in which the data signals selected for the individual elements are stored; and
a second storage circuit that stores n driving timing data signals that represent drive timing with which to drive the individual elements,
wherein the data signals corresponding to the individual elements are selected as a result of the latch circuit specifying data signals being fed from the first storage circuit to the data signal selector, and the lighting timing signals corresponding to the individual elements are selected as a result of the driving timing data signals being fed from the second storage circuit to the timing signal selector.

4. A driving IC as claimed in claim 3,
wherein the n elements are n light-emitting sections constituting a light-emitting device and arranged in an array, and
wherein, based on imaging positions of the individual light-emitting sections in a direction perpendicular to a direction in which the n light-emitting sections are arranged, the select circuit determines from which of the latch circuits to select the data signals corresponding to the light-emitting sections and with what timing to feed those data signals to the drive circuit.

5. A driving IC as claimed in claim 4,
wherein the driving IC is for driving a plurality of light-emitting sections of a light-emitting device provided in an optical print head, and
wherein, assuming that a print direction of a printer incorporating the optical print head is from up to down and that an imaging position of a light-emitting section located in a lowest position among imaging positions of the plurality of light-emitting sections is used as a reference position,
the farther are imaging positions of the light-emitting sections away from the reference position in the print direction, the latter are the stages of the latch circuits from which the corresponding data signals are selected.

6. A driving IC as claimed in claim 5,
wherein the y lighting timing signals recur every period allotted to a print line.

7. A driving IC as claimed in claim 6,
wherein, the farther are the imaging positions of the light-emitting sections away from a print line located below but closest to the imaging positions in the print direction, the later within a period allotted to that print line are the lighting timing signals in synchronism with which the corresponding data signals are fed to the drive circuit to drive the drive circuit.

8. A driving IC as claimed in claim 5,
wherein periods of the y lighting timing signals overlap with one another.

9. A driving IC as claimed in claim 4,
wherein periods of the y lighting timing signals overlap with one another.

10. A driving IC as claimed in claim 1, further comprising:
a first storage circuit that stores n latch circuit specifying data signals that represent the latch circuits in which the data signals selected for the individual elements are stored; and
a second storage circuit that stores n driving timing data signals that represent drive timing with which to drive the individual elements,
wherein the data signals corresponding to the individual elements are selected as a result of the latch circuit specifying data signals being fed from the first storage circuit to the data signal selector, and the lighting timing signals corresponding to the individual elements are selected as a result of the driving timing data signals being fed from the second storage circuit to the timing signal selector.

11. A driving IC as claimed in claim 1,
wherein the n elements are n light-emitting sections constituting a light-emitting device and arranged in an array, and
wherein, based on imaging positions of the individual light-emitting sections in a direction perpendicular to a direction in which the n light-emitting sections are arranged, the select circuit determines from which of the latch circuits to select the data signals corresponding to the light-emitting sections and with what timing to feed those data signals to the drive circuit.

12. A driving IC as claimed in claim 1,
wherein the driving IC is for driving a plurality of light-emitting sections of a light-emitting device provided in an optical print head, and
wherein, assuming that a print direction of a printer incorporating the optical print head is from up to down and that an imaging position of a light-emitting section located in a lowest position among imaging positions of the plurality of light-emitting sections is used as a reference position,
the farther are imaging positions of the light-emitting sections away from the reference position in the print direction, the latter are the stages of the latch circuits from which the corresponding data signals are selected.

13. A driving IC as claimed in claim 12,
wherein the y lighting timing signals recur every period allotted to a print line.

14. A driving IC as claimed in claim 13,
wherein, the farther are the imaging positions of the light-emitting sections away from a print line located below but closest to the imaging positions in the print direction, the later within a period allotted to that print line are the lighting timing signals in synchronism with which the corresponding data signals are fed to the drive circuit to drive the drive circuit.

15. A driving IC as claimed in claim 1,
wherein periods of the y lighting timing signals overlap with one another.

* * * * *